(12) United States Patent
Alonso-Mora et al.

(10) Patent No.: US 11,619,951 B2
(45) Date of Patent: *Apr. 4, 2023

(54) ON-DEMAND HIGH-CAPACITY RIDE-SHARING VIA DYNAMIC TRIP-VEHICLE ASSIGNMENT WITH FUTURE REQUESTS

(71) Applicant: Massachusetts Institute of Technology, Cambridge, MA (US)

(72) Inventors: Javier Alonso-Mora, Leiden (NL); Daniela L. Rus, Weston, MA (US); Alexander J. Wallar, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/941,449

(22) Filed: Mar. 30, 2018

(65) Prior Publication Data
US 2018/0224866 A1    Aug. 9, 2018

Related U.S. Application Data

(63) Continuation-in-part of application No. 15/877,935, filed on Jan. 23, 2018.

(60) Provisional application No. 62/478,889, filed on Mar. 30, 2017, provisional application No. 62/449,315, filed on Jan. 23, 2017.

(51) Int. Cl.
*G05D 1/02* (2020.01)
*G06Q 10/06* (2012.01)
*G06N 5/04* (2006.01)
*G05D 1/00* (2006.01)
*G08G 1/00* (2006.01)
*G06Q 10/0631* (2023.01)

(52) U.S. Cl.
CPC ......... G05D 1/0291 (2013.01); G05D 1/0088 (2013.01); G06N 5/04 (2013.01); G06Q 10/06311 (2013.01); G08G 1/202 (2013.01)

(58) Field of Classification Search
CPC .... G05D 1/0291; G05D 1/0088; G08G 1/202; G06Q 10/06311; G06N 5/04
USPC ......................................................... 701/26
See application file for complete search history.

(56) References Cited

U.S. PATENT DOCUMENTS

| | | | |
|---|---|---|---|
| 6,317,720 B1 * | 11/2001 | Murakami | G06Q 10/02 705/7.22 |
| 6,697,730 B2 * | 2/2004 | Dickerson | G06Q 50/30 701/465 |
| 6,701,300 B1 * | 3/2004 | Murakami | G06Q 10/06315 705/7.25 |

(Continued)

OTHER PUBLICATIONS

U.S. Appl. No. 15/877,935, filed Jan. 23, 2018, Alonso-Mora, et al.

(Continued)

*Primary Examiner* — Fadey S. Jabr
*Assistant Examiner* — Mohamed Abdo Algehaim
(74) *Attorney, Agent, or Firm* — Daly, Crowley, Mofford & Durkee, LLP

(57) ABSTRACT

Described is a method and system for vehicle routing and request assignment which incorporates a prediction of future demand. The method seamlessly integrates sampled future requests into request assignments and vehicle routing.

8 Claims, 24 Drawing Sheets

(56) References Cited

U.S. PATENT DOCUMENTS

| | | | |
|---|---|---|---|
| 7,363,126 | B1 | 4/2008 | Zhong et al. |
| 8,554,608 | B1* | 10/2013 | O'Connor ............ G08G 1/0962 |
| | | | 705/1.1 |
| 9,562,785 | B1* | 2/2017 | Racah ................ G01C 21/3438 |
| 9,754,490 | B2 | 9/2017 | Kentley et al. |
| 9,984,574 | B2* | 5/2018 | Laetz ..................... G08G 1/202 |
| 10,024,673 | B1* | 7/2018 | Zhang ................... G06Q 50/30 |
| 2002/0019760 | A1* | 2/2002 | Murakami ........... G06Q 10/047 |
| | | | 705/7.25 |
| 2012/0130627 | A1* | 5/2012 | Islam ..................... G06Q 10/08 |
| | | | 701/300 |
| 2012/0239452 | A1* | 9/2012 | Trivedi .................. G06Q 10/00 |
| | | | 705/7.22 |
| 2015/0081360 | A1* | 3/2015 | Sun ........................ G06Q 50/28 |
| | | | 705/7.13 |
| 2015/0161554 | A1* | 6/2015 | Sweeney .......... G06Q 10/08355 |
| | | | 705/7.15 |
| 2015/0161564 | A1* | 6/2015 | Sweeney ........ G06Q 10/063114 |
| | | | 705/338 |
| 2015/0339928 | A1* | 11/2015 | Ramanujam ........... G08G 1/202 |
| | | | 701/23 |
| 2015/0356483 | A1* | 12/2015 | Saliba .............. G06Q 10/06314 |
| | | | 705/7.24 |
| 2016/0027307 | A1* | 1/2016 | Abhyanker ............ G08G 1/005 |
| | | | 701/117 |
| 2016/0117610 | A1* | 4/2016 | Ikeda ..................... G06Q 10/02 |
| | | | 705/5 |
| 2016/0209220 | A1* | 7/2016 | Laetz ..................... G08G 1/202 |
| 2016/0300318 | A1* | 10/2016 | Godil ..................... G06Q 50/30 |
| 2016/0307287 | A1* | 10/2016 | Jat ....................... G06Q 30/0631 |
| 2017/0091891 | A1* | 3/2017 | Van Der Berg ....... G07B 15/02 |
| 2017/0256168 | A1* | 9/2017 | Lambert .......... G06Q 10/06315 |
| 2017/0365030 | A1* | 12/2017 | Shoham ................. G07B 15/02 |
| 2018/0033058 | A1* | 2/2018 | Mukherjee ......... G06Q 30/0282 |
| 2018/0060988 | A1* | 3/2018 | Klenk .................... G06Q 50/30 |
| 2018/0108103 | A1* | 4/2018 | Li ......................... G06Q 20/322 |
| 2018/0130356 | A1* | 5/2018 | Zhang .................... G08G 1/202 |
| 2018/0150085 | A1* | 5/2018 | Dey ......................... B25J 9/161 |
| 2018/0188731 | A1* | 7/2018 | Matthiesen ............ G06Q 10/02 |
| 2018/0202822 | A1* | 7/2018 | DeLizio ............. G01C 21/3407 |
| 2018/0209803 | A1* | 7/2018 | Rakah ................. G06K 9/00838 |
| 2018/0209804 | A1* | 7/2018 | Rakah ................ G06Q 10/0631 |
| 2018/0209805 | A1* | 7/2018 | Rakah ................ G06Q 10/0631 |
| 2018/0209806 | A1* | 7/2018 | Rakah ................ G01C 21/3461 |
| 2018/0211124 | A1* | 7/2018 | Rakah .................... G06Q 10/02 |
| 2018/0211185 | A1* | 7/2018 | Rakah ............... G08G 1/096822 |
| 2018/0211186 | A1* | 7/2018 | Rakah ................... G06Q 10/047 |
| 2018/0211541 | A1* | 7/2018 | Rakah .................... G06Q 50/30 |
| 2018/0238698 | A1* | 8/2018 | Pedersen ................. B60L 58/16 |
| 2018/0349825 | A1* | 12/2018 | Yamamoto ....... G06Q 10/06314 |
| 2018/0356239 | A1* | 12/2018 | Marco .................... G06Q 10/04 |
| 2018/0366004 | A1* | 12/2018 | Laetz ..................... G08G 1/202 |
| 2019/0251496 | A1* | 8/2019 | DaCosta .............. G01C 21/343 |
| 2019/0304043 | A1* | 10/2019 | Nakamura ................ G07C 1/10 |
| 2020/0104965 | A1* | 4/2020 | Ramot .................... G08G 1/202 |
| 2020/0211070 | A1* | 7/2020 | Singh ................. G06Q 30/0284 |
| 2020/0265348 | A1* | 8/2020 | Nimesh ............ G06Q 10/06314 |
| 2021/0192420 | A1* | 6/2021 | Spielman .............. G06N 20/00 |

OTHER PUBLICATIONS

Agatz, et al.; "Dynamic Ride-Sharing: A Simulation Study in Metro Atlanta;" ScienceDirect; Procedia Social and Behavior Sciences 17 (2011) 532-550; 19$^{th}$ International Symposium on Transportation and Traffic Theory; Jan. 2011; 19 pages.

Berbeglia, et al.; "Dynamic Pickup and Delivery Problems;" European Journal of Operational Research 202 (2010) 8-15; Jan. 2009; 8 pages.

Carrion, et al.; "Value of Travel Time Reliability: A Review of Current Evidence;" Transportation Research Part A 46 (2012) 720-741; Jan. 2012; 22 pages.

Castro, et al.; Urban Traffic Modelling and Prediction Using Large Scale Taxi GPS Traces; Proceedings of the 10$^{th}$ International Conference on Pervasive Computing; pp. 57-72; Jun. 2012; 17 pages.

Cordeau; "A Branch-and-Cut Algorithm for the Dial-a-Ride Problem;" Oper Res 54(3); Oct. 28, 2003; 25 pages.

Correia, et al.; "Solving the User Optimum Privately Owned Automated Vehicles Assignment Problem (UO-POAVAP): A Model to Explore the Impacts of Self-Driving Vehicles on Urban Mobility;" Transportation Research Part B 87 (2016) 64-88; Mar. 2016; 25 pages.

Delling, et al.; "Engineering Route Planning Algorithms;" Algorithmics of Large and Complex Networks; pp. 117-139; Jan. 2009; 23 pages.

Donovan, et al.; "Using Course GPS Data to Quantify City-Scale Transportation System Resilience to Extreme Events;" arXiv:1507.06011v1 [psysics.soc-ph]; Jul. 21, 2015; 16 pages.

Gonzales, et al.; "Modeling Taxi Demand with GPS Data from Taxis and Transit;" Mineta National Transit Research Consortium; College of Business; Report 12-16; Jul. 2014; 84 pages.

Helsgaun; "An Effective Implementation of the Lin-Kernighan Traveling Salesman Heuristic;" European Journal of Operational Research; vol. 126; Issue 1; Oct. 2000; 71 pages.

Hennessy, et al.; "Traffic Congestion, Driver Stress, and Driver Aggression;" Aggressive Behavior; vol. 25; pp. 409-423; Oct. 27, 1999; 16 pages.

Horn; "Fleet Scheduling and Dispatching for Demand-Responsive Passenger Services;" Transportation Research Part C 10 (2002) 35-63; Jan. 2002; 29 pages.

Ma, et al.; "T-Share: A Large-Scale Dynamic Taxi Ridesharing Service;" 2013 IEEE 29$^{th}$ International Conference on Data Engineering (CDE) pp. 410-421; Apr. 2013; 12 pages.

Moreira-Matias, et al.; "On Predicting the Taxi-Passenger Demand: A Real-Time Approach;" RPIA 2013; International Progress in Artificial Intelligence; pp. 54-65; Sep. 2013; 12 pages.

Pant, et al.; "Estimation of the Contribution of Road Traffic Emissions to Particulate Matter Concentrations from Field Measurements;" University of Birmingham; Atmospheric Environment; vol. 77; Apr. 2013; 70 pages.

Pavone, et al.; "Robotic Load Balancing for Mobility-on-Demand Systems;" International Journal of Robotics Research; Jan. 6, 2013; 26 pages.

Pillac, et al.; "A Review of Dynamic Vehicle Routing Problems;" European Journal of Operational Research; CIRRELT; Oct. 2011; 29 pages.

Santi, et al.; "Quantifying the Benefits of Vehicle Pooling with Shareability Networks;" Proceedings of National Academy of Sciences; vol. 111; No. 37; Sep. 16, 2014; 5 pages.

Shrank, et al.; TTI's 2012 Urban Mobility Report; Texas A&M Transportation Institute; Dec. 2012; 68 pages.

Spieser, et al.; "Shared-Vehicle Mobility-On-Demand Systems: A Fleet Operator's Guide to Rebalancing Empty Vehicles;" Transportation Research Board 95$^{th}$ Annual Meeting; Oct. 24, 2015; 15 pages.

Spieser, et al.; "Toward a Systematic Approach to the Design and Evaluation of Automated Mobility-on-Demand Systems: A Case Study in Singapore;" Road Vehicle Automation (Springer International Publishing); pp. 229-245; Jan. 2014; 17 pages.

Zhang, et al.; "Control of Robotic Mobility-On-Demand Systems: a Queueing-Theoretical Perspective;" Proceedings of Robotics: Science and Systems Conference; Apr. 2014; 10 pages.

Stenger, at al.; "An Adaptive Variable Neighborhood Search Algorithm for a Vehicle Routing Problem Arising in Small Package Shipping;" Transportation Science; Institute for Operations Research and the Management Sciences (INFORMS); Jun. 28, 2018; 18 pages.

U.S. Non-Final Office Action dated Aug. 9, 2019 for U.S. Appl. No. 15/877,935; 46 Pages.

NYC Open Data, "2014 Yellow Taxi Trip Data;" Retrieved from https://data.cityofnewyork.us/view/gn7m-em8n on Aug. 13, 2019; 2 Pages.

Response to U.S. Non-Final Office Action dated Aug. 9, 2019 for U.S. Appl. No. 15/877,935; Response filed on Sep. 18, 2019; 10 Pages.

(56) References Cited

OTHER PUBLICATIONS

U.S. Final Office Action dated Dec. 12, 2019 for U.S. Appl. No. 15/877,935; 84 Pages.
Response to U.S. Final Office Action dated Dec. 12, 2019 for U.S. Appl. No. 15/877,935; Response filed on Mar. 6, 2020; 10 Pages.
U.S. Non-Final Office Action dated Sep. 4, 2020 for U.S. Appl. No. 15/877,935; 72 Pages.
Final Office Action dated Mar. 4, 2021, U.S. Appl. No. 15/877,935, 76 pages.

* cited by examiner

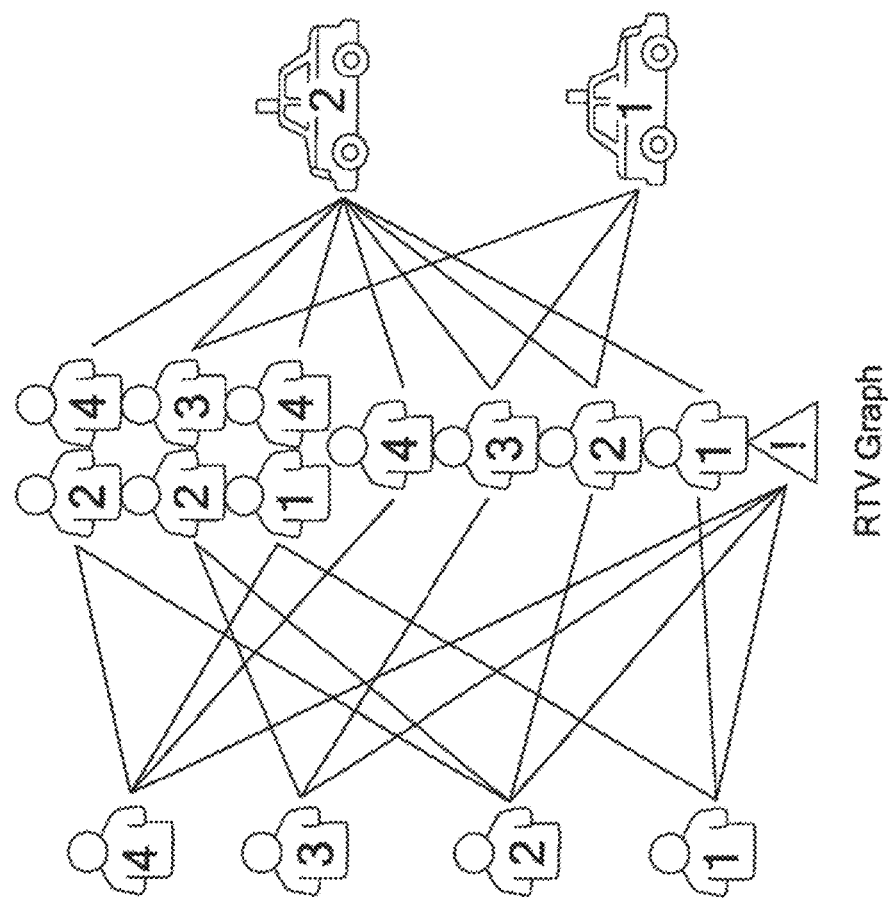
Fig. 1C RTV Graph
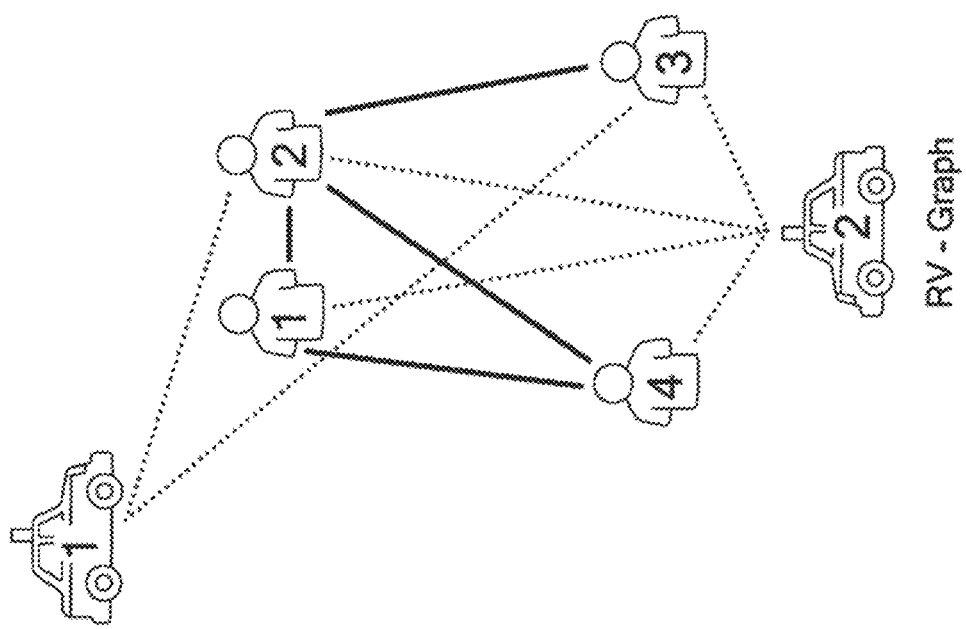
Fig. 1B RV - Graph

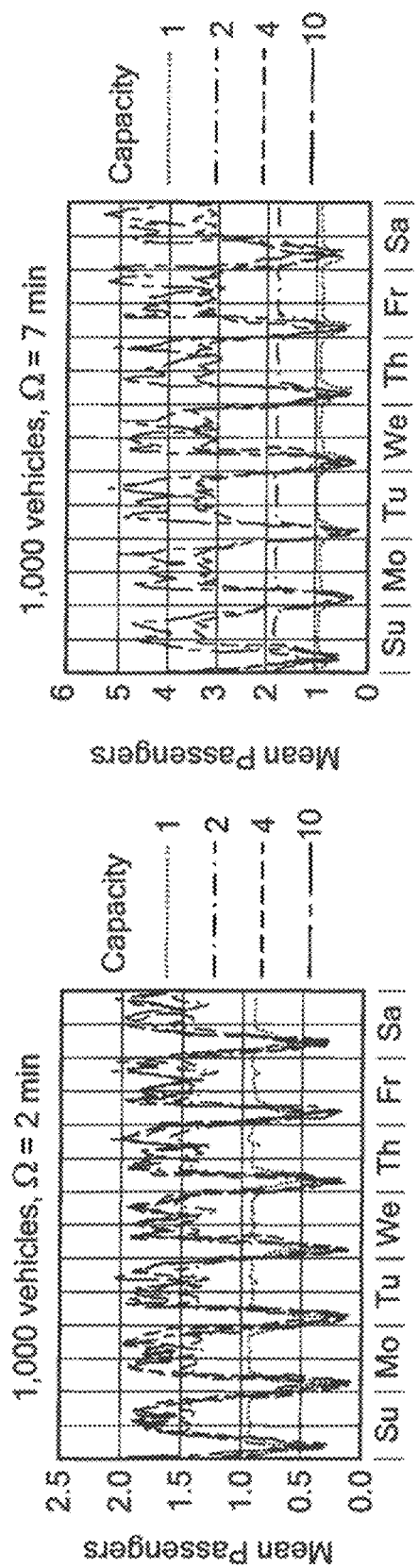
Fig. 4A
Fig. 4B
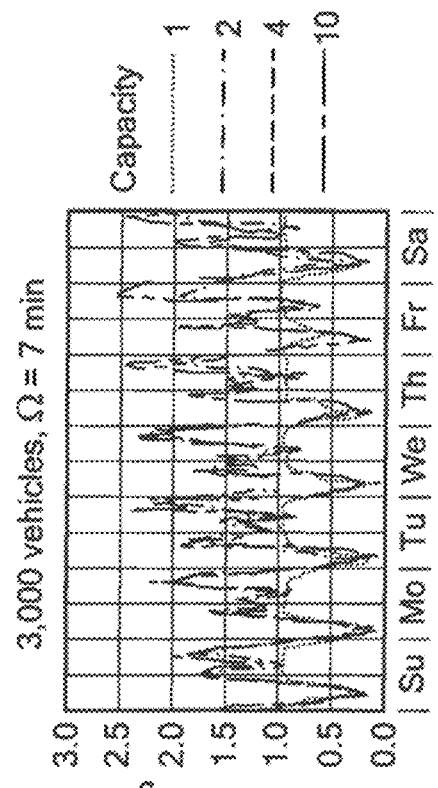
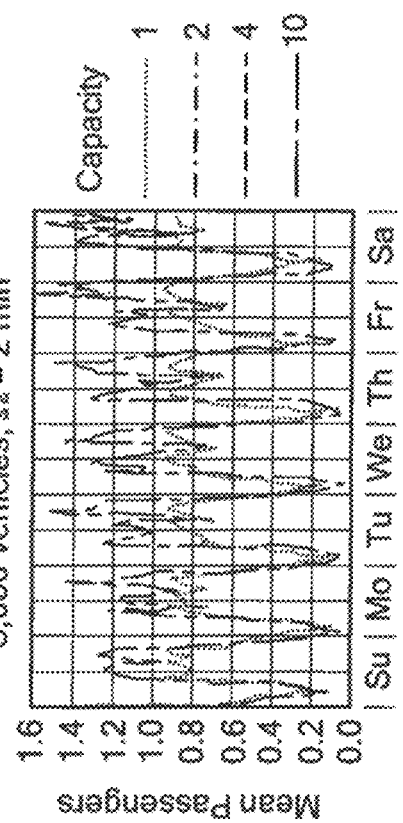
Fig. 4C
Fig. 4D

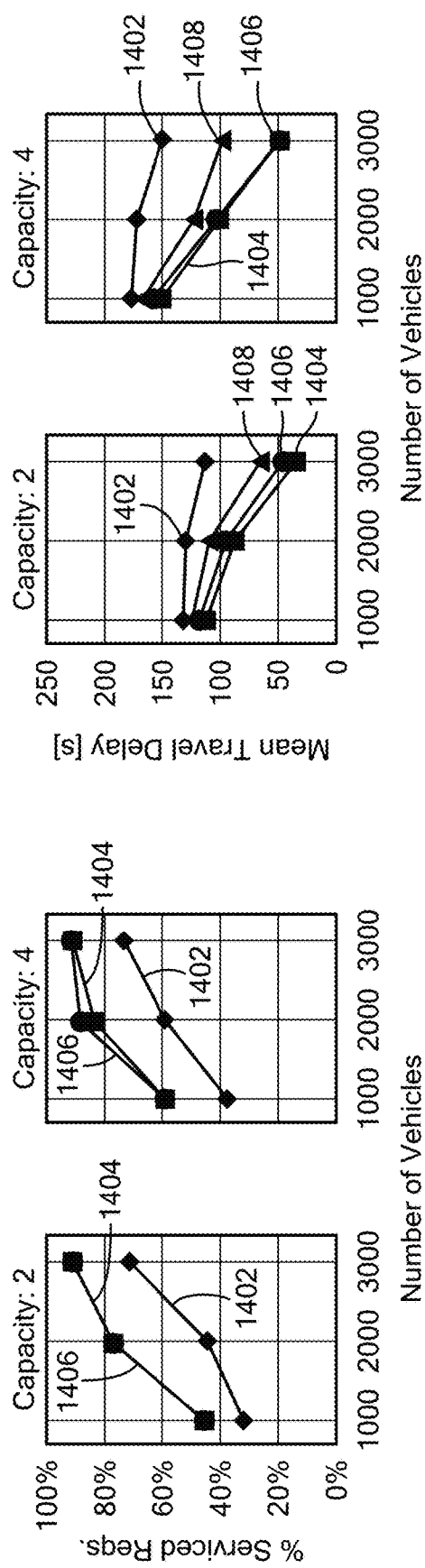
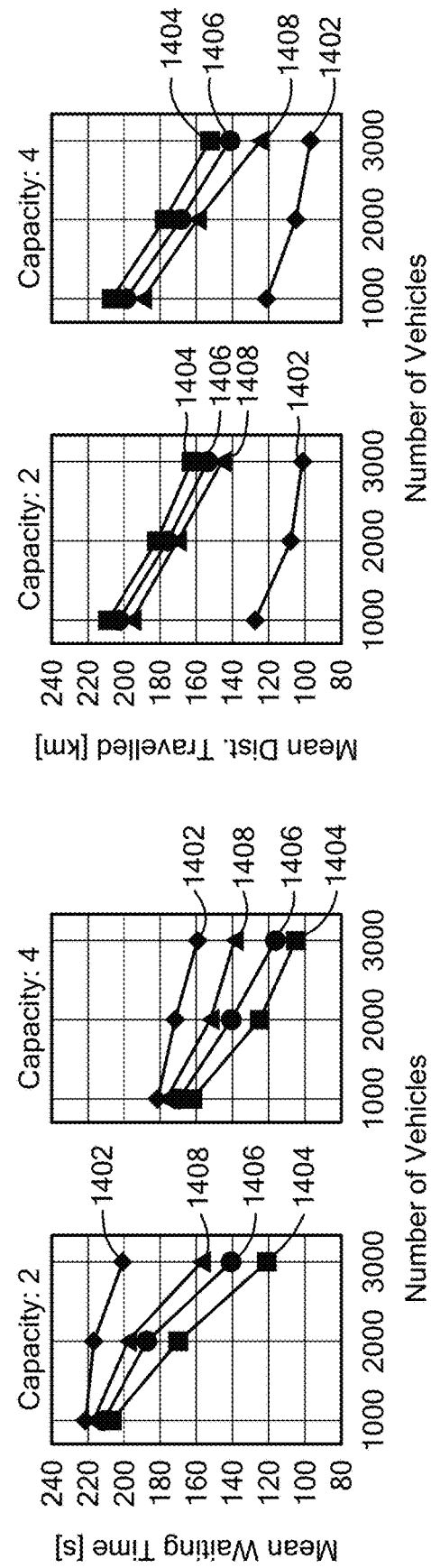
Fig. 14A
Fig. 14B
Fig. 14C
Fig. 14D

ON-DEMAND HIGH-CAPACITY RIDE-SHARING VIA DYNAMIC TRIP-VEHICLE ASSIGNMENT WITH FUTURE REQUESTS

CROSS REFERENCE TO RELATED PATENT APPLICATION

This application claims the benefit of U.S. Provisional Application No. 62/478,889 filed Mar. 30, 2017. This application is also a continuation-in-part of application Ser. No. 15/877,935 filed Jan. 23, 2018 which application claims the benefit of U.S. Provisional Application No. 62/449,315 filed Jan. 23, 2017. Each of the above applications are hereby incorporated herein by reference in their entireties.

GOVERNMENT RIGHTS

This invention was made with Government support under Grant N00014-12-1-1000 awarded by the Office of Naval Research. The Government has certain rights in the invention.

BACKGROUND

As is known in the art, in the domain of intelligent transportation, ridesharing systems with autonomous vehicles are a relatively new frontier for enhancing the efficiency of urban mobility.

As is also known, ride sharing services, such as UberPool and Lyft Line, are transforming urban mobility. Also known as vehicle pooling options, these systems allow several passengers, typically limited to two, to share a vehicle when traveling along similar routes. Similar services include Via, which provides vehicle pooling with vans, and Bridj, which provides an alternative to buses. Currently these companies relay on drivers to operate the vehicles, but there is a push in the industry towards autonomous self-driving vehicles. Examples include Google, Uber, Nutonomy and other major car manufacturers. These fleets of autonomous vehicles are expected to provide safe, reliable and affordable transportation.

Yet, efficient methods capable of assigning travel requests to a fleet of vehicles, and routing the vehicles efficiently, are required.

Informed driving is becoming a key feature to increase the sustainability of taxi companies and with a combination of readily available large datasets and powerful data mining tools, estimation of future patterns from data is an active field of research. Several works have looked at estimating future demand given past taxi data, for example.

A recent study in New York City showed that up to 80% of the taxi trips in Manhattan could be shared by two riders with an increase in the travel time of a couple minutes and also showed the gains attainable by a "global oracle" with full knowledge of the future. Much of the fleet management literature for mobility-on-demand systems consider the case of ridesharing without pooling requests, focusing on fluid approximations, queuing based formulations, case studies in specific regions. and operational considerations for fleet managers. With the growing interest and rapid developments in autonomous vehicles, there has also been an increasing focus on autonomous mobility-on-demand systems. However, none of these works consider the ride-pooling problem of servicing multiple rides with a single trip nor the prediction of future requests.

It would, therefore, be desirable to provide a system and technique which considers the ride-pooling problem of servicing multiple rides with a single trip as well as the prediction of future requests.

SUMMARY

It has been recognized herein that the ridesharing problem is related to the vehicle-routing problem and the dynamic pickup and delivery problem in which spatiotemporally distributed demand must be picked up and delivered within prespecified time windows.

It has also been recognized that one challenge when addressing this problem is the need to explore a very large decision space, while computing solutions fast enough to provide users with the experience of real-time booking and ride service.

It would therefore, be desirable to provide a system and technique which improves, and ideally fully address the potential of ride-sharing services.

In one aspect of the concepts described herein, described are a system and technique for real-time high-capacity ride-sharing that (i) scales to large numbers of passengers and trips and (ii) dynamically generates optimal routes with respect to online demand and vehicle locations is described.

In one embodiment, the system and techniques may be used to implement ridesharing with rider capacity of up to 10 simultaneous passengers per vehicle.

In another aspect of the disclosed concepts, described is a ridesharing technique which utilizes a reactive anytime optimal method (i.e. a method that efficiently returns a valid assignment of travel requests to vehicles and then refines it over time, converging to an optimal solution).

With this particular arrangement, a system and technique for controlling a fleet of vehicles with varying occupant capacities which address both the problems of assigning vehicles to matched passengers and rebalancing—or repositioning—the fleet to service demand is provided. The system and method described herein solve the unified problem of passenger and vehicle assignment in a computationally efficient manner at a large scale and demonstrates the capability of operating a real-time MoD system with multiple service tiers (shared-taxi, shared-vans, and shared-buses) of varying capacity. If enough computational resources are available, the optimal assignment for the current requests and time would be found; otherwise, the best solution found so far (e.g. within a selected, determined or measured period of time) is returned.

In another aspect of the disclosed concepts, described is a system which utilizes a reactive anytime optimal method (i.e. a method that efficiently returns a valid assignment of travel requests to vehicles and then refines it over time, converging to an optimal solution). If enough computational resources are available, the optimal assignment for the current requests and time would be found; otherwise, the best solution found within given limitations (e.g. a given time limit) is returned.

In accordance with a further aspect of the concepts described herein, a technique for assigning ridesharing requests to vehicles includes (a) receiving current requests for rides from one or more vehicles within a fleet of vehicles within a window; (b) generating a pairwise request-vehicle shareability graph (RV-graph); (c) generating a generating a request-trip-vehicle graph (RTV-graph) of trips and the vehicles that can serve them; (d) solving an integer linear program (ILP) to determine an assignment of vehicles to trips; and (e) assigning specific vehicles from the fleet of vehicle to specific trips.

With this particular arrangement, a technique for assigning ridesharing requests to vehicles which is efficient and scalable is provided. In embodiments, the method starts from a greedy assignment and improves it through a constrained optimization, quickly returning solutions of good quality and converging to the optimal assignment over time. In embodiments, the method further includes determining the feasibility of trips in the RTV-graph. In embodiments, the method further includes rebalancing idle vehicles to areas with high demand. In embodiments, the method further is applied to a fleet of autonomous vehicles. In embodiments, tradeoffs may be made between fleet size, capacity, waiting time, travel delay, and operational costs for low- to medium-capacity vehicles, such as taxis and van shuttles and desired performance.

In one embodiment, a highly scalable anytime optimal technique is described. In embodiments, such a system and technique the system and technique can be applied such that in a shared vehicle fleet with passenger capacities of up to ten, 2,000 vehicles (15% of the taxi fleet) of capacity 10 or 3,000 of capacity 4 can serve 98% of the demand within a mean waiting time of 2.8 min and mean trip delay of 3.5 min.

The described system and techniques may be applied to fleets of autonomous vehicles and also incorporates rebalancing of idling vehicles to areas of high demand. This technique framework is general and can thus be used for many real-time multivehicle, multitask assignment problems.

In another aspect of the concepts sough to be protected herein, it has recognized that some traditional approaches that rely on an integer linear program (ILP) formulation (such as Cordeau J F (2006) A branch-and-cut technique for the dial-a-ride problem. *Oper Res* 54(3):573-586), also provide anytime guarantees for the multivehicle-routing problem.

However, in contrast to the approach described herein, the applicability of prior art approaches is limited to small problem instances (e.g. 32 requests and 4 vehicles, with a computation cost of several minutes in the above cited J F Cordeau reference).

And while the techniques and systems described herein also rely on an ILP formulation, they do not explicitly model the edges of the road network in the ILP. Thus, the approach described herein scales to much larger problem instances. For example, the techniques and systems described herein can provide real time solutions to large problem instances such as New York City, with thousands of vehicles, requests, and road segments.

The approach described herein decouples the problem by first computing feasible trips from a pairwise shareability graph and then assigning trips to vehicles. It is shown that this assignment can be posed as an ILP of reduced dimensionality. The framework allows for flexibility in terms of prescribing constraints such as (but not limited to) maximum user waiting times and maximum additional delays due to sharing a ride. The method also be extended to proactively rebalance the vehicle fleet by moving idle vehicles to areas of high demand.

Detailed experimental results of an illustrative embodiment are presented for a subset of 3 million rides extracted from the New York City taxicab public dataset. It is shown that 3,000 vehicles with a capacity of 2 and 4 could serve 94 and 98% of the demand with a mean waiting time of 3.2 and 2.7 min, and a mean delay of 1.5 and 2.3 min, respectively. To achieve 98% service rate, with comparable waiting time (2.8 min) and delay (3.5 min), a fleet of just 2,000 vehicles with a capacity of 10 was required. This fleet size is 15% of the active taxis in New York City. One also shows that our approach is robust with respect to the density of requests and could therefore be applied to other cities.

The system described herein operates in real time and is particularly well suited for use with autonomous vehicle fleets that can continuously reroute based on real-time requests. It can also rebalance idle vehicles to areas with high demand and is general enough to be applied to other multivehicle, multitask assignment problems.

In accordance with a further aspect of the concepts described herein, a system for controlling and continuously rerouting an fleet of vehicles based up on real-time ride requests includes (a) means for receiving current requests for rides from one or more vehicles within a fleet of vehicles within a window; (b) means for generating a pairwise request-vehicle shareability graph (RV-graph); (c) means for generating a generating a request-trip-vehicle graph (RTV-graph) of trips and the vehicles that can serve them; (d) means for solving an integer linear program (ILP) to determine an assignment of vehicles to trips; and (e) means for assigning specific vehicles from the fleet of vehicle to specific trips.

With this particular arrangement, a system for controlling a fleet of vehicles with varying passenger capacities which address both the problems of assigning vehicles to matched passengers and rebalancing—or repositioning—the fleet to service demand is provided. One show how the unified problem of passenger and vehicle assignment can be solved in a computationally efficient manner at a large scale, thereby demonstrating the capability to operate a real-time MoD system with multiple service tiers (shared-taxi, shared-vans, and shared-buses) of varying capacity.

In embodiments, the fleet of vehicles may include one or more autonomous vehicles.

In embodiments, the fleet of vehicles may be provided as a fleet of autonomous vehicles.

In embodiments, the system may further comprise means for rebalancing idle vehicles (either autonomous or non-autonomous vehicles) to areas with high demand.

In accordance with a further aspect of the concepts described herein, a method for controlling and continuously rerouting a fleet of vehicles based up on real-time ride requests, includes (a) receiving current requests for rides from one or more vehicles within a fleet of vehicles within a window; (b) generating a pairwise request-vehicle shareability graph (RV-graph); (c) generating a generating a request-trip-vehicle graph (RTV-graph) of trips and the vehicles that can serve them; (d) solving an integer linear program (ILP) to determine an assignment of vehicles to trips; and (e) assigning specific vehicles from the fleet of vehicle to specific trips.

With this particular arrangement, a method for controlling a fleet of vehicles with varying passenger capacities and which address both the problems of assigning vehicles to matched passengers and rebalancing—or repositioning—the fleet to service demand is provided. It is shown how the unified problem of passenger and vehicle assignment can be solved in a computationally efficient manner at a large scale, thereby demonstrating the capability to operate a real-time MoD system with multiple service tiers (shared-taxi, shared-vans, and shared-buses) of varying capacity.

In embodiments, the method may control either or both of autonomous vehicles and non-autonomous vehicles. In embodiments, the method may control one or more autonomous vehicles. In embodiments, the method may control a fleet of only autonomous vehicles. In embodiments, the method may control a fleet of only non-autonomous vehicles.

In embodiments, the method may further comprise rebalancing idle vehicles (either autonomous or non-autonomous vehicles) to areas having a high demand or ride requests.

It should be appreciated that the concepts, systems and techniques described herein find use in a variety of different applications including, but not limited to: routing of vehicles, taxi/shuttle/bus/boat ride sharing, package delivery, logistics and multi-vehicle multi-task assignment.

Also described herein is an efficient constrained optimization method for vehicle routing and multi-request multi-vehicle assignment that takes into account a prediction of the future demands (i.e. future ride sharing requests) as well as a system which uses such a method.

In an embodiment, the described method and system utilize a constrained optimization technique that leverages historical data to address a persistent mobility-on-demand task with a large network of self-driving vehicles (e.g. taxis). In particular, the described method and system are capable of assigning thousands of requests to thousands of vehicles (e.g. autonomous vehicles) in real time and route them in an informative way which accounts for future predicted ride requests.

Consequently, the described method and system allows several passengers with independent trips to share a vehicle and allows such passenger-loaded vehicles to pick additional passengers as the vehicles (with passengers on-board) progress through their routes. Based upon historical data, a probability distribution over future demand may be computed. Then, samples from the learned probability distribution are incorporated into any-time optimal method for vehicle routing and passenger assignment to take into account the predicted future demand. The benefits and trade-offs of this predictive approach are shown in an experimental evaluation with over three million rides extracted from a dataset of taxi trips in New York City. The method and system described herein produces routes and assignments that, in expectation, reduce the travel and waiting times for passengers, with respect to a purely reactive approach. Besides the mobility on demand application, the method described herein is general and could also be applied to other multi-task multivehicle assignment and routing problems.

In one aspect, described herein is a constrained optimization method which accounts for future, predicted, requests to route vehicles. The method includes computing a probability distribution over future demand. In embodiments this may be accomplished based upon historical data.

In another aspect, described is an any-time optimal method for vehicle routing and passenger assignment that takes into account the future demand to produce routes and assignments that in expectation reduce the travel and waiting times. The method can assign thousands of requests to thousands of vehicles (including but not limited to autonomous vehicles) in real time, while allowing passengers (e.g. several passengers) with independent trips to share a vehicle and that a vehicle may select additional passengers as it progresses in its route.

The system and method described herein accounts for the state of individual vehicles within a fleet of vehicles and the requests at a current time instance while also incorporating a prediction of future demand. This approach results in better positioning of vehicles within a fleet of vehicles towards satisfying future requests. Such a system and technique are directed toward achieving long term optimality of ride-sharing assignment and routing.

BRIEF DESCRIPTION OF THE DRAWINGS

The foregoing features may be more fully understood from the following description of the drawings in which:

FIG. 1B is a pairwise shareability RV-graph of requests and vehicles. Cliques of this graph are potential trips;

FIG. 1C is an RTV-graph of candidate trips and vehicles which can execute them. A node (yellow triangle) is added for requests that cannot be satisfied;

FIG. 4A is a plot of mean number of passengers per vehicle vs. time for four different vehicle types (capacity one, two, four, and ten) over a one-week time period for a vehicle fleet size of 1000 vehicles and a maximum waiting time of two (2) minutes;

FIG. 4B is a plot of mean number of passengers per vehicle vs. time for four different vehicle types (capacity one, two, four, and ten) over a one-week time period for a vehicle fleet size of 1000 vehicles and a maximum waiting time of seven (7) minutes;

FIG. 4C is a plot of mean number of passengers per vehicle vs. time for four different vehicle types (capacity one, two, four, and ten) over a one-week time period for a vehicle fleet size of 3000 vehicles and a maximum waiting time of two (2) minutes;

FIG. 4D is a plot of mean number of passengers per vehicle vs. time for four different vehicle types (capacity one, two, four, and ten) over a one-week time period for a vehicle fleet size of 3000 vehicles and a maximum waiting time equal to seven (7) minutes;

FIGS. 14A-14F are a series of graphs which present a comparison of several performance metrics for varying number of sampled requests.

DETAILED DESCRIPTION

Figure 1:
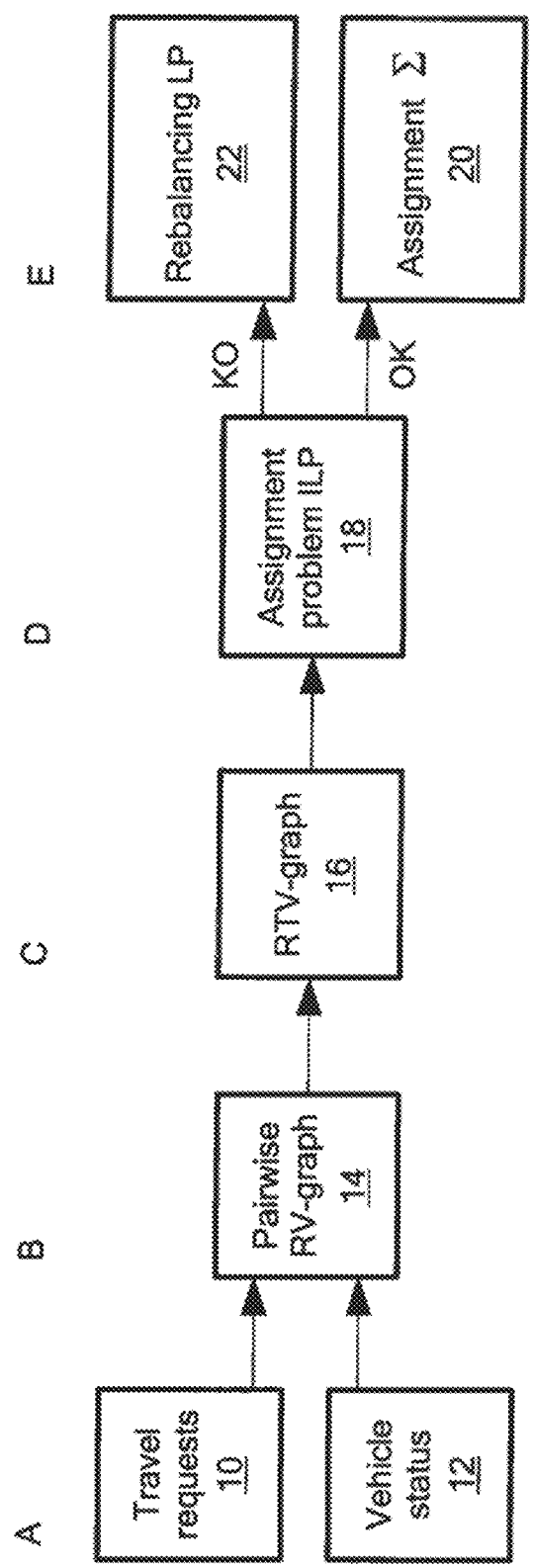
FIG. 1 is a flow diagram of a method for batch assignment of multiple ride requests to multiple vehicles of capacity v.

Before describing concepts, systems, devices and techniques and details of a ridesharing system and technique for assigning travel requests to vehicles and finding optimal routes for the vehicle fleet, some introductory concepts and terminology are explained.

As used herein, the term "ridesharing" refers to the sharing of vehicles by persons. One form of ridesharing, for example, is carpooling. Carpooling may be described as the sharing of a vehicle (e.g. a passenger vehicle such as a car) by two or more persons so that more than one-person travels in a car. Another form of ridesharing is vanpooling. Vanpools are an element of a transit system that allow groups of people to share a ride similar to a carpool, but on a larger scale with concurrent savings in fuel and vehicle operating costs. A special case of ridesharing is referred to "ridepooling" where multiple requests may be served by the same vehicle simultaneously.

Vehicles in a ridesharing operation may be provided by individuals, individuals in cooperation with various public and private support programs, by companies (e.g. private taxi cab companies) through a program operated by or on behalf of an element of government, or a program operated by or on behalf of a public or private employer.

An important concept of ridesharing is that people share a vehicle while travelling from one or more common or disparate starting locations (or "origins") to different or a common ending location (or "destination"). Thus, each person may have different starting locations and different ending locations, each person may have different starting locations and the same (or substantially the same) ending location (e.g. a common destination such as a work center such as an office building, or corporate campus, or an educational campus, for example), each person may have the same starting location (e.g. a common meeting place) and different ending locations or each person may have the same starting location (e.g. a common meeting place) and a common ending location.

Ridesharing may be real-time ridesharing—e.g. a form of taxi-like service in which vehicles may, for example, be operated by independent contractors who may receive requests for rides (i.e. ride-requests) online (e.g. over the internet using a third-party matchmaking application) and provide transport services (e.g. rides) to people in real-time.

Furthermore, ridesharing may be conducted as peer-to-peer ridesharing. Peer-to-peer ridesharing can be divided along a spectrum ranging from commercial, for-fee transportation network companies to for-profit ridesharing services to informal nonprofit peer-to-peer carpooling arrangements. Many modern peer-to-peer ridesharing schemes rely on web applications and/or mobile app technology available to potential users (e.g. people seeking some form of rideshare arrangement).

In general overview, described herein is a framework for techniques and systems for solving the real-time ride-pooling problem with (i) arbitrary numbers of passengers and trips, (ii) anytime optimal rider allocation and routing dependent on the fleet location, and (iii) online rerouting and assignment of riders to existing trips.

The techniques described herein address the problems of both optimally assigning one or more travel requests R (e.g. online travel requests) to one or more vehicles in a fleet of vehicles and finding routes for at least the assigned vehicles in the vehicle fleet. Ideally, and as will be described in detail below, (e.g. with respect to some cost function, an example of which will be provided herein below) the assignments of travel requests to vehicles are optimal or near-optimal assignments and the routes for the vehicle fleet are optimal or near-optimal routes.

In the description provided hereinbelow, considered is a fleet V of m vehicles of capacity v, where v represents the maximum number of passengers each vehicle can have at any given time. An individual travel request r may be one of a set of travel requests R (i.e. R={$r_1, \ldots r_n$}).

Also, as used herein, the term "passenger" is defined as a traveler (e.g. a person) who has submitted a travel request (e.g. a past travel request) and has been picked up by a vehicle and that is now in route to its destination and the term $P_v$ denotes a set of passengers for vehicle of the fleet (i.e. v∈V).

FIG. 1 illustrates an anytime optimal process for batch assignment of a set of requests R={$r_1 \ldots r_n$} to a set of vehicles V={$v_1 \ldots v_m$}, which: (1) reduces (and ideally minimizes) a cost function C (to be described below); (2) satisfies a set of constraints Z (to be described below); and (3) allows for multiple passengers per vehicle. It should be appreciated that the fleet may be the entire set of vehicles but need not be (i.e. the set of vehicles may be some or all of the fleet of vehicles). Also included the process of FIG. 1 is an optional process to rebalance a fleet of vehicles (to which the set of vehicles V belongs). It should be appreciated that rebalancing can be done on the entire fleet of vehicles or less than the entire fleet of vehicles. For example, rebalancing may be done on just the set of vehicles V by driving idle vehicles to areas of high demand, where those vehicles are likely to be required in the future.

Turning now to FIG. 1, a method for batch assignment of multiple ride requests to multiple vehicles of capacity v begins as shown in processing blocks 12 and 14 in which one or more travel requests 12 and one or more indicators of vehicle status 14 are received. Each travel request includes at least a time of request, a pickup location and a drop-off location. The number of vehicles for which a vehicle status is received may be some or all of the vehicles in the fleet.

Figure 1A:
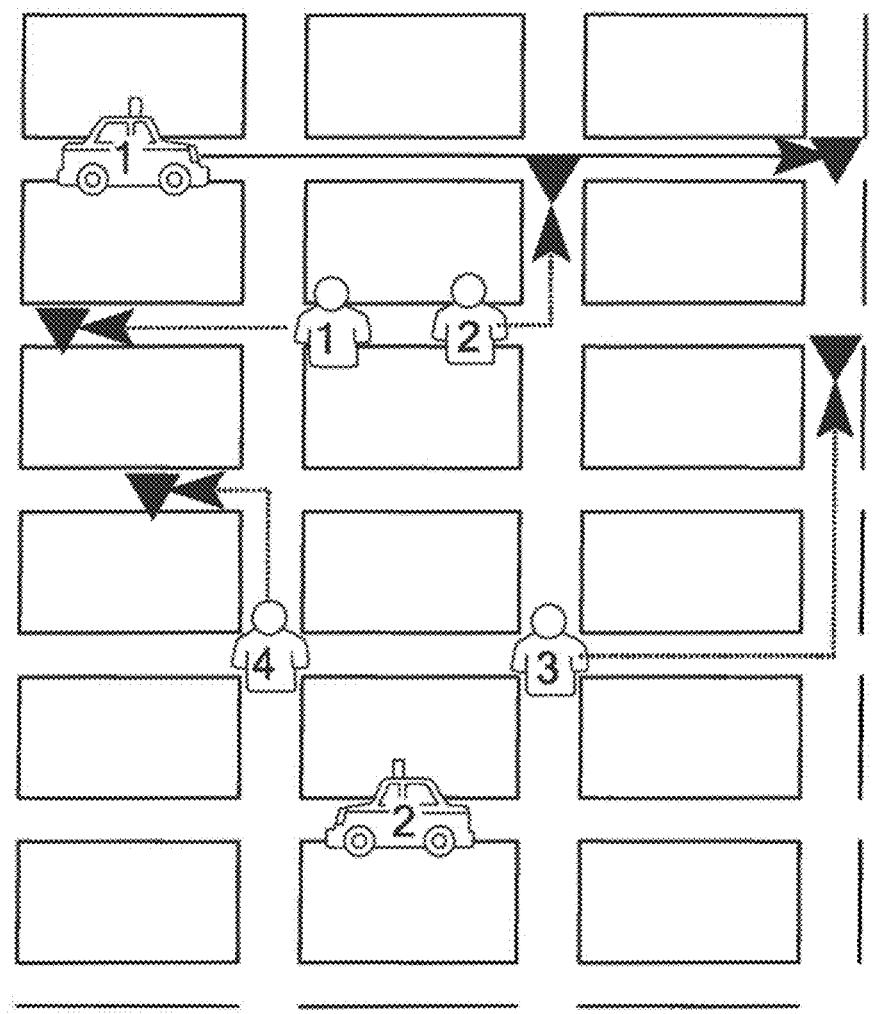
FIG. 1A is a diagram of an illustrative street network with four requests and two vehicles with a first one of the vehicles having one passenger and a second one of the vehicles being empty of passenger-occupants.
Figure 1D:
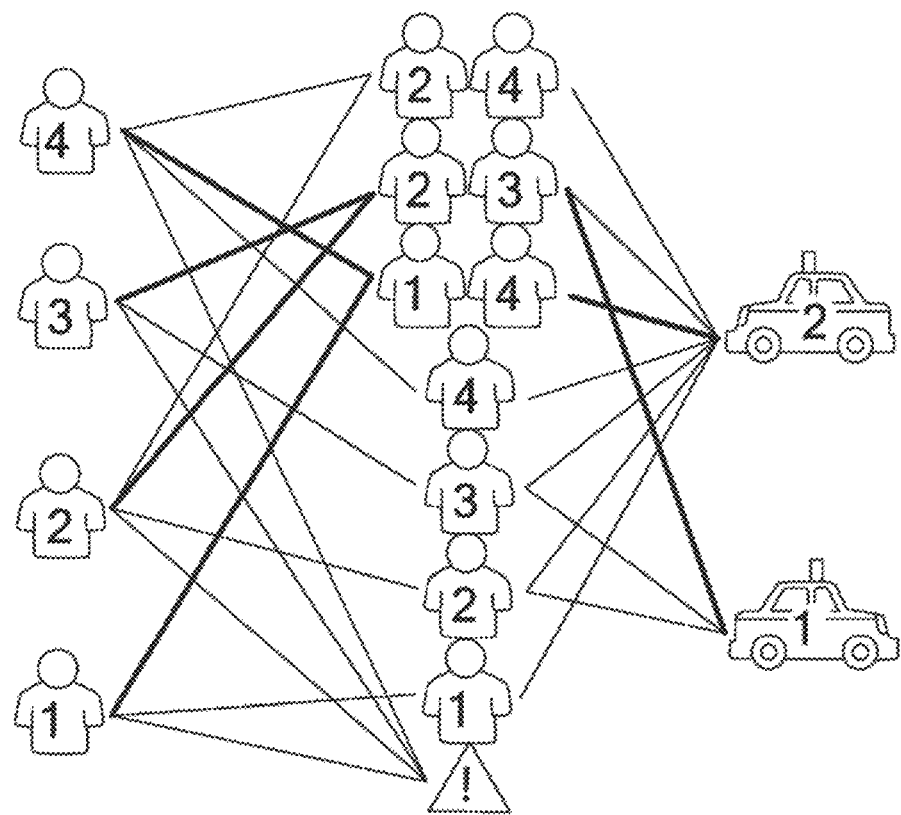
FIG. 1D is a diagram illustrating optimal vehicle assignments given by the method of FIG. 1 (i.e. a solution of the Integer Linear Program (ILP)), where vehicle 1 serves requests 2 and 3 and vehicle 2 serves requests 1 and 4.
Figure 1E:
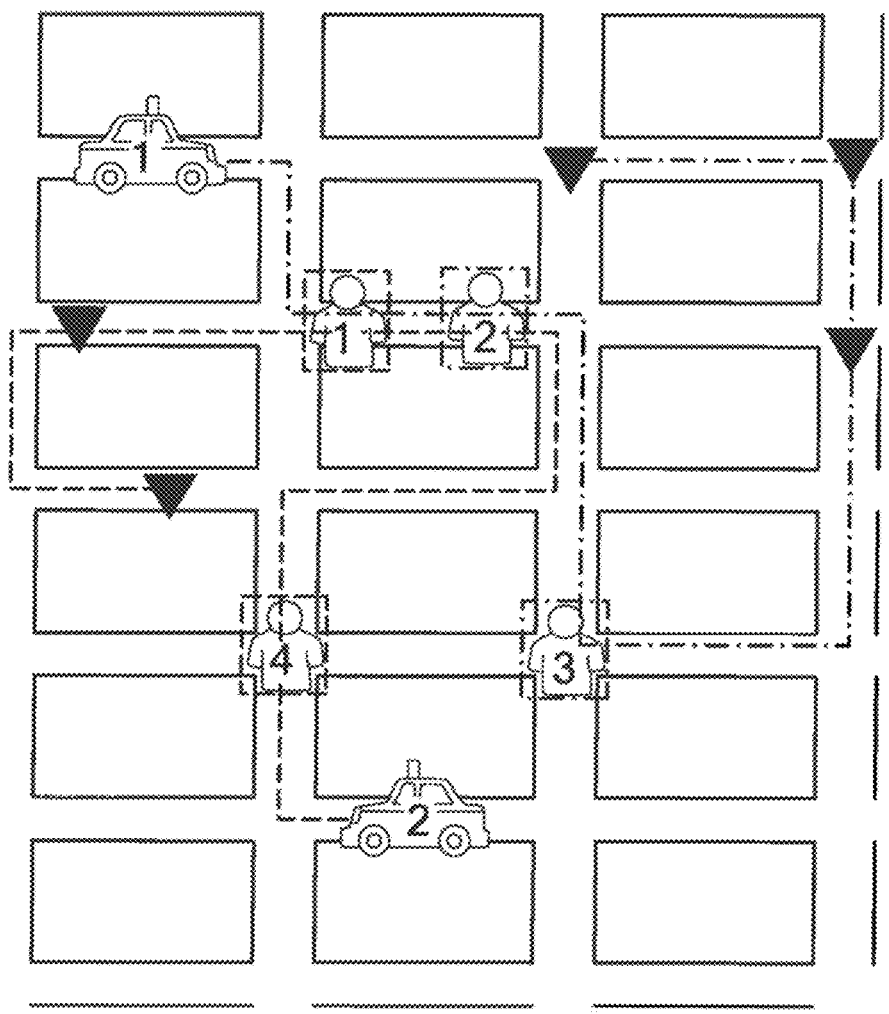
FIG. 1E is a diagram illustrating planned routes for the two vehicles and their assigned requests. In this case, no rebalancing process is required because all requests and vehicles are assigned.

Referring briefly to FIG. 1A, an example scenario includes an illustrative street network with four requests (orange human, origin; red triangle, destination) and two vehicles (yellow car, origin; red triangle, destination of passenger). Vehicle 1 has one passenger, and vehicle 2 is empty.

Figure 2:
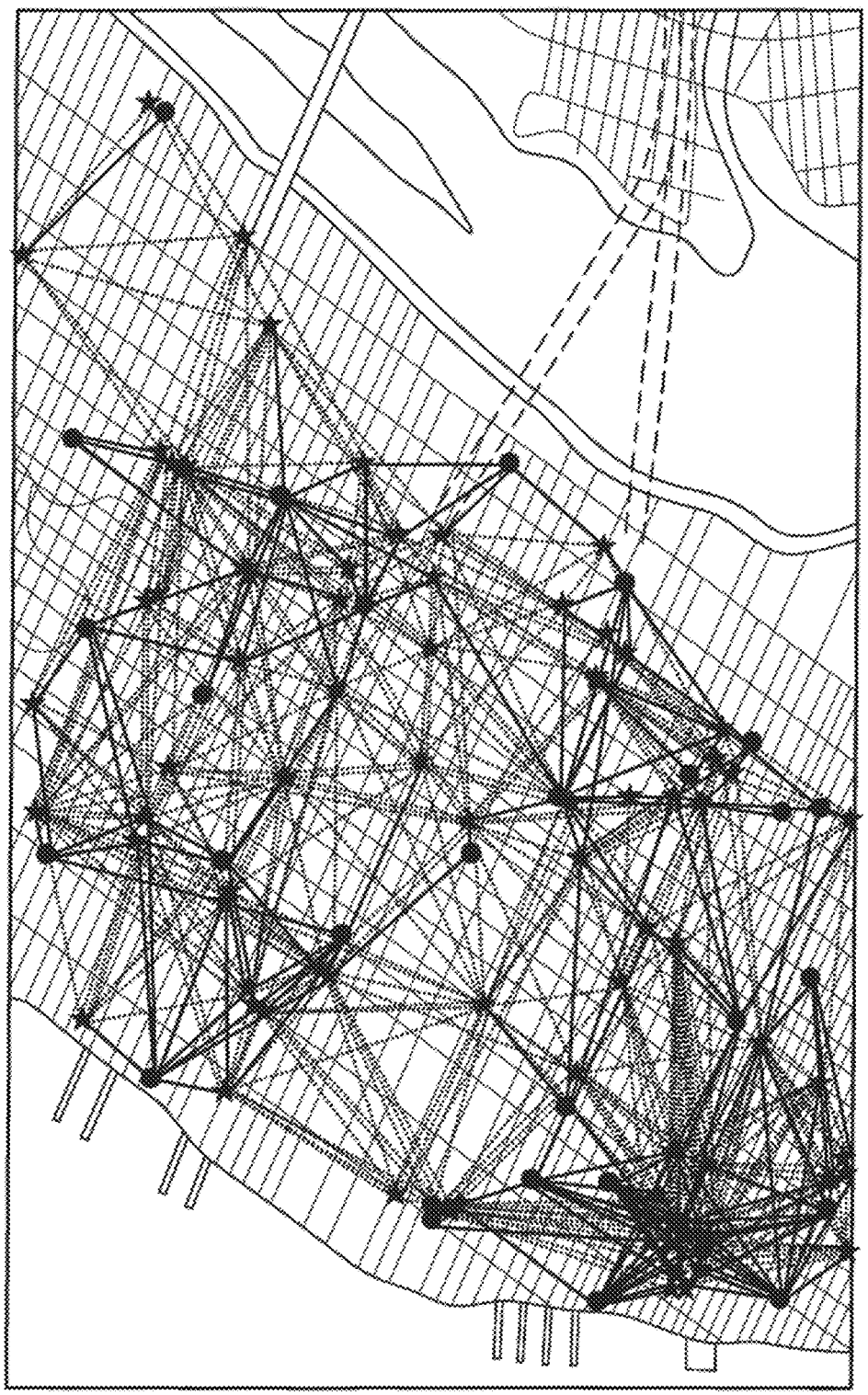
FIG. 2 is a diagram of an illustrative pairwise RV-graph.

Turning again to FIG. 1, after receipt of at least some travel requests and vehicle status indicators, a pairwise request-vehicle graph (RV-graph) is formed as shown in processing block 14. The RV-graph represents which requests and vehicles might be pairwise-shared, and significantly, also includes the vehicles at their current state. FIG. 1B is an RV-graph for the scenario of FIG. 1A while FIG. 2 is an example of a more complex RV-graph having 90 requests (star) and 30 vehicles (circle) with edges between two requests in dotted red and between a request and a vehicle in solid green. The maximum waiting time and delay are three and six minutes in this example.

Processing then proceeds to processing block 16 in which a round trip vehicle graph (RTV graph) is formed. In particular cliques of the RV-graph (or regions for which its induced subgraph is complete) are explored to find feasible trips and are used to compute the RTV-graph in a manner to be described below. Suffice it here to say that the RTV-graph is used to determine if a trip is feasible (i.e. the RTV-graph is used to determine whether all of the requests can be picked up and dropped off by some vehicle, while satisfying one or more constraints).

Processing then proceeds to processing block 18 in which assignment problem Integer Linear Program (ILP) processing is performed. In embodiments, an anytime optimal technique may be used for batch assignment of a set of requests R={$r_1, \ldots r_n$} to a set of vehicles V={$v_1, \ldots v_m$} which: (1) optimizes (and ideally minimizes) a cost function C; (2) satisfies a set of constraints Z; and (3) allows for multiple passengers per vehicle.

Solutions from the ILP processing 18 are provided to processing block 20 in which assignment processing (i.e. the actual assigning of requests to vehicles) is performed.

Solutions from the ILP processing 20 may also optionally be provided to processing block 22 where rebalancing is performed. Such rebalancing is accomplished, at least in part, by moving idle vehicles to areas in which those vehicles are likely to be required in the future (i.e. so-called "areas of high demand"). In embodiments, "regions of high demand" may generally be defined as regions where there are more requests than those that can be serviced with the vehicles in the region. It should be appreciated that the concepts and techniques described herein need not consider specifically defined regions, but rather do an assignment of "idle" vehicles to "ignored" requests, where an ignored request is a request that was not assigned to any vehicle in the assignment step. Details of rebalancing are described hereinbelow.

It should be appreciated that in some instances, it may be possible that only assignment processing is required while in other instances it may be possible that only rebalancing processing while in still other instances assignment processing and rebalancing processing may both be required.

It should also be appreciated that the formulation illustrated in FIG. 1 is flexible with respect to physical and performance-related constraints that might need to be added (i.e. it is possible to add, modify or otherwise incorporate different physical and/or performance-related constraints).

In an illustrative implementation consistent with the broad concepts describe herein, the following rules are considered:
(i) for each request r, the waiting time $\omega_r$, given by the difference between a pickup time $t_r^p$ and a request time $t_r^r$, must be below a maximum waiting time $\Omega$, for example, 2 minutes;
(ii) for each passenger or request r the total travel delay $\delta_r = t_r^d - t_r^*$ must be lower than a maximum travel delay $\Delta$, for example, 4 min, where
 $t_r^d$ corresponds to a drop-off time of a request r; and
 $t_r^* = t_r^r + r(o_r, d_r)$ corresponds to the earliest possible time at which the destination could be reached if the shortest path between the origin $o_r$ and the destination $d_r$ was followed without any waiting time and wherein the total travel delay $\delta_r$ includes both the in-vehicle delay and the waiting time.
(iii) for each vehicle v, a maximum number of passengers, $n_p^{pass} \leq v$ (for example, capacity 10).

The cost C of an assignment is defined as the sum of the total travel delays $\delta_r$ (which includes the waiting time) over all assigned requests and passengers, plus a large constant $c_{ko}$ for each unassigned request.

Given an assignment Σ of requests to vehicles, the set of requests that have been assigned to some vehicle is denoted as $R_{ok}$ and the set of unassigned requests (e.g. due to the constraints or the fleet size) is denoted $R_{ko}$. This constrained optimization problem may be formally express as:

$$C(\Sigma) = \Sigma_{v \in V} \Sigma_{r \in P_v} \delta_r + \Sigma_{r \in R_{ok}} \delta_r + \Sigma_{r \in R_{ko}} c_{ko}. \quad (1)$$

This constrained optimization problem represented by Eq. 1 may be solved via the process as illustrated in FIGS. 1 and 1B-1E which are: (1) computing a pairwise request-vehicle shareability graph (RV-graph), as illustrated, for example, in FIG. 1B; (2) computing a graph of feasible trips and the vehicles that can serve them (RTV-graph) as illustrated, for example, in FIG. 1C; (3) solving an ILP to compute the assignment of vehicles to trips (and ideally to compute optimal assignment of vehicles to trips) as illustrated, for example, in FIG. 1D; and optionally (4) rebalancing remaining idle vehicles. It should be appreciated that in FIG. 1E, no rebalancing processing process is required because all requests and vehicles are assigned. The details of an illustrative a rebalancing process are described below.

Given a network graph with travel times, a so-called "travel function" for single-vehicle routing may be formed and expressed as travel (v, $R_v$). For a vehicle v, with passengers $P_v$, this function returns a travel route (and ideally an optimal or near-optimal travel route) $\sigma_v$ to satisfy requests $R_v$. This route reduces (and ideally minimizes) a sum of delays (e.g. the sum of delays $\Sigma_{r \in P_v \cup R_v} \delta r$) subject to one or more constraints Z (e.g. one, some (e.g. a subset) or all of: waiting time, delay, and capacity). Other constraints, may of course, also be used.

For vehicles having a relatively low (or small) occupant capacity, such as a sedan style taxi cab, the optimal path can be computed via an exhaustive search. For vehicles with larger capacity (e.g. greater than five (5) total occupants), heuristic methods such as the Lin-Kernighan technique (as described, for example, in Helsgaun K (2000) An effective implementation of the Lin-Kernighan traveling salesman heuristic. *Eur J Oper Res* 126(1):106-130), the Tabu Search technique (as described, for example, in Glover F, Laguna M (2013) Tabu Search? (Springer, Berlin); or a simulated annealing approach (as described, for example, in Pham D T, Karaboga D (2012) Intelligent Optimisation Techniques: Genetic Algorithms, Tabu Search, Simulated Annealing and Neural Networks (Springer Science & Business Media, Berlin) may be used. Furthermore, other techniques known to those of ordinary skill in the art, may of course, also be used.

As noted above in conjunction with the example of FIG. 1B, the RV-graph represents which requests and vehicles might be pairwise-shared and builds on the idea of shareability graphs. Significantly the RV-graph described herein also includes the vehicles at their current state. One vehicle stat is "$V_{idle}$" which is defined as: vehicle is empty and unassigned to any request (it might be in movement if it was rebalancing in the previous step). Other vehicle states include, but are not limited to, empty en route to pick some passenger; rebalancing; with #passengers, where #can be 1, 2, 3, . . . v (max vehicle capacity).

The method begins by computing (a) which requests can be pairwise combined, and (b) which vehicles can serve which requests individually, given their current passengers (i.e. compute a pairwise graph of vehicles and requests—i.e. an RV-graph). This builds on the idea of share-ability graphs, but is it not limited to the requests and includes the vehicles at their current state as well.

In the described processing, two requests r1 and r2 are connected if some empty vehicle starting at the origin of one of them could pick up and drop off both requests while satisfying one or more designated constraints Z. A cost $\delta_{r1} + \delta_{r2}$ is associated to each edge e(r1, r2). Similarly, a request r and a vehicle v are connected if the request can be served by the vehicle while satisfying the constraints Z, as given by the travel function travel(v,r). The edge is denoted as e(r,v).

Next, the cliques of the RV-graph—or regions for which its induced subgraph is complete—are explored to find feasible trips and compute an RTV-graph (e.g. as illustrated in FIG. 1C). A trip T={$r_1$, . . . , $r_{nT}$} is a set of nT requests (where n is the number of passengers) to be combined in one vehicle. A trip is feasible if all of the requests can be picked up and dropped off by some vehicle, while satisfying some. most or all of the constraints Z.

As noted above, a trip is feasible if all of the requests can be picked up and dropped off by some vehicle, while satisfying the constraints Z and thus it is necessary to determine which trips are feasible trips. There may exist several trips of varying size that can service a particular request. In addition, more than one vehicle might be able to service a trip. Once feasible trips are identified, the assignment process will ensure that each request and vehicle are assigned to a maximum of one trip.

With reference to FIG. 1C, it should be noted that an RTV-graph contains two types of edges: a first type of edge is denoted e(r;T) corresponding to edges between a request r and a trip T that contains request r (i.e., $\exists e(r,T) \leftrightarrow r \in T$); and a second type of edge is denoted e(T,v), corresponding to edges between a trip T and a vehicle v that can execute the trip (i.e., $\forall e(T,v) \leftrightarrow travel(v,T)$ is feasible). The cost $\Sigma_{r \in P_v \cup T} \delta r$, sum of delays, is associated to each edge e(T,v).

The process to determine the feasible trips and edges proceeds incrementally in trip size for each vehicle, starting from the request-vehicle edges in the RV-graph. An illustrative process (which may be considered as a process for generating an RTV-graph such as that shown in FIG. 1C above) is shown in Table 1 below.

TABLE 1

1: T = ∅
2: for each vehicle v ∈ V do
3.   $T_k$ = ∅ ∀k ∈ {1, . . . , v}
4.   [Add trips of size one]
5.   for e(r, v) edge of RV-graph do
6.     $T_1$ ← T = {r}; Add e(r, T) and e(T, v)
7.   [Add trips of size two]
8.   for all {$r_1$}, {$r_2$} ∈ $T_1$ and e($r_1$, $r_2$) ∈ RV-graph do
9.     if travel (v,{ $r_1$, $r_2$}) = valid then
10.      $T_2$ ← T = {$r_1$, $r_2$}; Add e($r_i$, T) and e(T, v)
11.  [Add trips of size k]
12.  for k ∈ {3, . . . , v} do
13.    for all $T_1$, $T_2$ ∈ $T_{k-1}$ with |$T_1$ ∪ $T_2$| = k do
14.      Denote $T_1$ ∪ $T_2$ = {$r_1$, . . . , $r_k$}
15.      if ∀i ∈ {1, . . . , k}, {$r_1$, . . . , $r_k$} \ $r_i$ ∈ $T_{k-1}$ then
16.        if travel (v, $T_1$ ∪ $T_2$) = valid then
17.          $T_k$ ← T = $T_1$ ∪ $T_2$
18.          Add e($r_i$, T), ∀$r_i$ ∈ T, and e(T, v)
19.  T ← $\cup_{i \in \{1,...,v\}} T_i$ For computational efficiency, one can optionally decide to rely on the fact that a trip T only needs to be checked for feasibility if there exists a vehicle v for which all of its sub-trips T'=T\r (obtained by removing one request) are feasible and have been added as edges e(T', v) to the RTV-graph.

Once feasibility is determined, the assignment of vehicles to trips (and ideally the optimal assignment $\Sigma_{optimum}$ of vehicles to trips) is computed. This optimization is formalized as an ILP, initialized with a greedy assignment (or any other technique well-known to those of ordinary skill in the art that quickly provides a feasible solution) obtained directly from an RTV-graph. To compute the greedy assignment ($\Sigma_{greedy}$,) trips are assigned to vehicles iteratively in decreasing size of the trip and increasing cost (e.g. sum of travel delays). The general concept is to increase (and ideally maximize) the number (i.e. amount) of requests served while reducing (and ideally, minimizing) the cost. An illustrative process is shown in Table 2 below.

TABLE 2

```
1: R_ok = 0; V_ok = 0
2: for k = v; k > 0; k -- do
3:   S_k := sort e(T, v) in increasing cost, ∀T ∈ T_k, v ∈ V
4:   while Sk ≠ 0 do
5:     pop e(T, v) ← S_k
6:     if ∀r ∈ T, r ∉ R_ok ∉ V_ok then
7:       R_ok ← {∀r ∈ T}; V_ok ← v
8:       Σgreedy ← e(T, v)
```

Described below is a method to assign trips to vehicles (and ideally, a method to optimally assign trips to vehicles).

1) Variables: A binary variable $\in_{i,j} \in \{0,1\}$ is introduced for each edge $e(T_i, V_j)$ between a trip $T_i \in T$ and a vehicle $v_j \in V$ in the RTV-graph. If $\in_{i,j}=1$ then vehicle $v_j$ is assigned to trip $T_i$. Denote by $\varepsilon_{TV}$ the set of $\{i, j\}$ indexes for which an edge $e(T_i, v_j)$ exists in the RTV-graph.

An additional binary variable $X_k \in \{0, 1\}$ is introduced for each request $r_k \in R$. These variables are active, $X_k=1$, if the associated request $r_k$ cannot be served by any vehicle and is ignored.

Denote the set of variables X as:

$$X=\{\in_{i,j}, X_k; \forall e(T_i, v_i) \text{ node in } RTV\text{-graph } \forall r_k \in R\}. \quad (2)$$

2) Cost: The cost function C, equivalent to C(Σ) in Equation (1), is given by $$C(X) := \Sigma_{i,j \in \varepsilon_{TV}} c_{i,j} \in_{i,j} + \Sigma_{K \in \{0,\ldots,n\}} c_{ko} X_k, \quad (3)$$

where the individual costs are given by the sum of delays, $$c_{i,j} = \Sigma_{r \in T_i}(t_r^d = t_r^*), \text{ as returned by travel } (v_j, T_i), \quad (4)$$

and $c_{ko}$ is a large enough constant to penalize ignored requests.

3) Constraints: Two types of constraints are included, as follows.

Each vehicle is assigned to a single trip at most, $$\Sigma_{e \in \rho \tau_j^v} \in_{i,j} \leq 1 \forall v_j \in V, \quad (5)$$

Where $\tau_j^v$ denotes the indexes i for which an edge $e(T_i, v_j)$ exists in the TRV-graph. Each request is assigned to a vehicle or ignored, $$\Sigma_{i \in \tau_k^R} \Sigma_{j \in \tau_i^T} \in_{i,j} + X k = 1 \ \forall r_k \in R, \quad (6)$$

Where $\tau_k^R$ denotes the indexes for i for which an edge $e(r_k, T_i)$ exists in the RTV-graph and $\tau_i^T$ denotes the indexes j for which an edge $e(T_i, v_j)$ exists in the RTV-graph. This is, the trips of which the request forms part and the vehicles that can service each of those trips.

4) Assignment: The optimal assignment is found by solving an ILP optimization defined by the aforementioned variables, cost and constraints, as shown in Table 3 below.

Starting from the greedy assignment, the ILP can be solved with state of the art solvers via branch and bound with heuristics and duality gap checking. These processes can be parallelized and return a suboptimal solution if stopped before convergence.

It should be noted that the cost function of Eq. 3 is equivalent to Eq. 1 only if the cost term ci,j of an individual assignment, of trip i to vehicle j, is given by the sum of delays for all current passengers and assigned requests of vehicle i, minus the sum of delays for all current passengers of vehicle i if it were not to take any additional requests.

The optimization problem is formulated in Table 3 below. A binary variable $\in_{i,j} \in \{0,1\}$; is introduced for each edge $e(T_i, v_i)$ between a trip $T_i \in T$ and a vehicle $v_j \in V$ in the RTV-graph. If $\in_{i,j}=1$ then vehicle $v_j$ is assigned to trip $T_i$.

The set of $\{i, j\}$ indices for which an edge $e(T_i, v_j)$ exists in the RTV-graph, i.e., the set of possible pickup trips is denoted $\varepsilon_{TV}$. An additional binary variable $X_k \in \{0,1\}$ is introduced for each request $r_k \in R$. These variables are active, i.e., $X_k=1$, if the associated request $r_k$ cannot be served by any vehicle and is ignored. The set of variables is then $X=\{\in_{i,j}; Xk, \forall e(T_i, v_j) \text{ edge in RTV-graph and } \forall r_k \in R\}$.

The cost terms $c_{i,j}$ are the sum of delays for trip Ti and vehicle $v_j$ pickup (stored in the $e(T_i, v_i)$ edge of the RTV-graph) and $c_{ko}$ is a large constant to penalize ignored requests.

Two types of constraints are included. Line 3 in Table 3 below imposes that each vehicle is assigned to one trip at most. Line 4 in Table 3 imposes that each request is assigned to a single vehicle or ignored. In these constraints, three sets appear.

The set of trips that can be serviced by a vehicle j, or edges $e(T_i, v_j)$, is denoted as $I_{T=j}^V$.

The set of trips that contain request k, or edges $e(r_k; T_i)$, is denoted as $I_{R=k}^V$.

The set of vehicles that can service trip i, or edges $e(T_i, v_j)$, is denoted as $I_{T=i}^V$.

This ILP is solved incrementally from the greedy assignment $\Sigma_{greedy}$, thereby improving the quality of the assignment over time.

TABLE 3

1: Initial guess: $\Sigma_{greedy}$

2: $\sum_{optim} := \arg \min_X \sum_{i,j \in \varepsilon_{TV}} c_{i,j} \in_{i,j} + \sum_{k \in \{1,\ldots,n\}} c_{ko} \chi k$ 3: s.t. $\sum_{i \in T_{V=j}} \in i, j \leq 1 \quad \forall V_j \in V$ 4: $\sum_{i \in T_{R=k}^T} \sum_{J \in T_{T=i}^V} \in i, j + \chi k = 1 \quad \forall r_k \in R$ The above method for assigning travel requests to vehicles is well suited for online execution to assign incoming requests r(t) to a fleet of vehicles for which a pool of requests R is maintained where (i) new requests are added as they are received and (ii) requests are removed when they are either (a) picked up by a vehicle or (b) could not be successfully matched to any vehicle within the maximum waiting time (e.g. they are ignored).

In embodiments, requests are collected during a window which may, for example be provided as a time window or an event window. In implementations in which the window is provided as a time window, the time window may be "open," (i.e. the system may accept requests) for a preselected period of time (e.g., 30 seconds). In selecting the size of the time window (i.e. the duration of time for which requests can be collected) the factors to consider include, but are not limited to computational time and resources and a number of requests per minute. Alternatively, in some embodiments, the window could simply be based on a number of requests received rather than based on time (e.g. during "rush hour" or after a "major event" such as a concert or sporting event game) where many requests may be received substantially simultaneously. It is possible to dynamically compute and adjust the size of the window (e.g. either a time-based or non time-based window). For example, the duration of a time window could change based upon a variety of factors, including, but not limited to, the number of requests per minute, computational resources, number of available vehicles, etc . . . .

After expiration of the time window, at least some (and preferably all) of the collected requests are assigned in batch to the different vehicles. If a request is matched to a vehicle at any given iteration, its latest pickup time is reduced to the expected pickup time by that vehicle and the cost $X_{ko}$ of ignoring it is increased for subsequent iterations. A request might be re-matched to a different vehicle in subsequent iterations so long as its waiting time does not increase and until it is picked up by some vehicle. Once a request is picked up (i.e., the request becomes a passenger), it remains in that vehicle and cannot be re-matched. The vehicle may, however, still pick additional passengers. In each iteration, the new assignment of requests to vehicles guarantees that the current passengers (occupants of the vehicle) are dropped off to a desired destination within the maximum delay constraint.

After the assignment, due to fleet imbalances, the set $R_{ko}$ of unassigned requests may not be empty, and some empty vehicles (i.e. vehicles unoccupied except for a driver in the case where the vehicle is not an autonomous vehicle) designated as $V_{idle}$ may still by unassigned to any request. These imbalances may occur when idle vehicles are in areas far away from an area of current requests and/or due to the maximum waiting time and/or delay constraints and/or vehicle capacity. Under the assumptions that (a) ignored requests may wait longer and request again, (b) it is likely that more requests occur in the same area where all requests cannot be satisfied, and (c) there are not enough requests in the neighborhood of the idle cars, the following approach may be used to rebalance the fleet of vehicles by moving only the idle vehicles.

To rebalance the vehicle fleet, after each batch assignment, vehicles having a status of $V_{idle}$ are assigned to requests in $R_{ko}$ to reduce, and ideally minimize, the sum of travel times, with the constraint that either all requests or all of the vehicles are assigned. The process begins by first computing the travel time $T_{v,r}$ of each individual idle vehicle having the status of $V_{idle}$ to pick each individual request in $R_{ko}$, the set of ignored—or not serviced—request and then obtaining an assignment (ideally, an optimum assignment), via a linear program as described in Table 4 below. With this approach, if all requests can be satisfied, some vehicles may remain idle, saving fuel and distance traveled (which may be, for example, the case at nighttime).

TABLE 4

1: Given: the idle (empty, stopped and unassigned) vehicles $V_{idle}$, and the unassigned requests $R_{ko}$.
2: Given: the shortest travel time $T_{v,r}$ for vehicle $v \in V_{idle}$ to pick request $r \in R_{ko}$.
3: Variables: $Y = \cup_{v \in V_{idle}, r \in R_{ko}} y_{v,r}$. Where $y_{v,r} \in \mathbb{R}$ indicates individual assignments.
4:
5: $\Sigma_{rebalance} := \arg_y{}^{min} \Sigma_{v \in V_{idle}} \Sigma_{r \in R_{ko}} T_{v,r} y_{v,r}$
6:   s.t. $\Sigma_{v \in V_{idle}} \Sigma_{Rko} y_{v,r} = \min(|V_{idle}|, |R_{ko}|)$
        $0 \leq y_{v,r} \leq 1 \ \forall y_{v,r} \in Y$.
7:
8:
9: Where |.| denotes the number of elements of a set.
10: The solution of this Linear Program is also a solution of the Integer Linear Program with $y_{v,r} \in \{0, 1\}$.

Figure 3B:
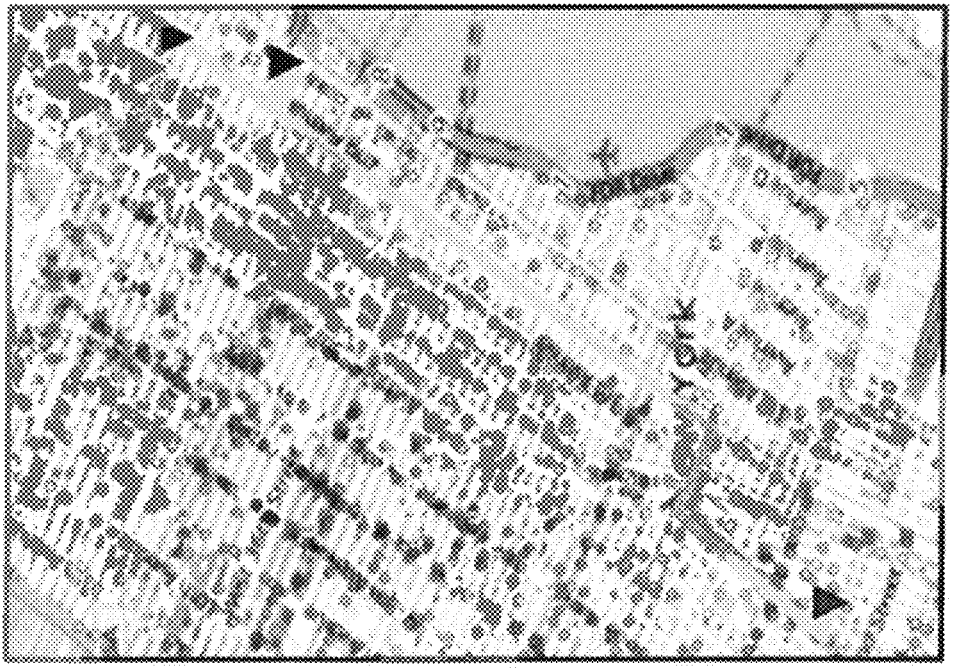
FIG. 3B is an enlarged view of a portion of the geographic region illustrated in FIG. 3A showing an enlarged view of a scheduled path for a vehicle with four passengers, which drops one off, picks up a new one, and drops all four.
Figure 3A:
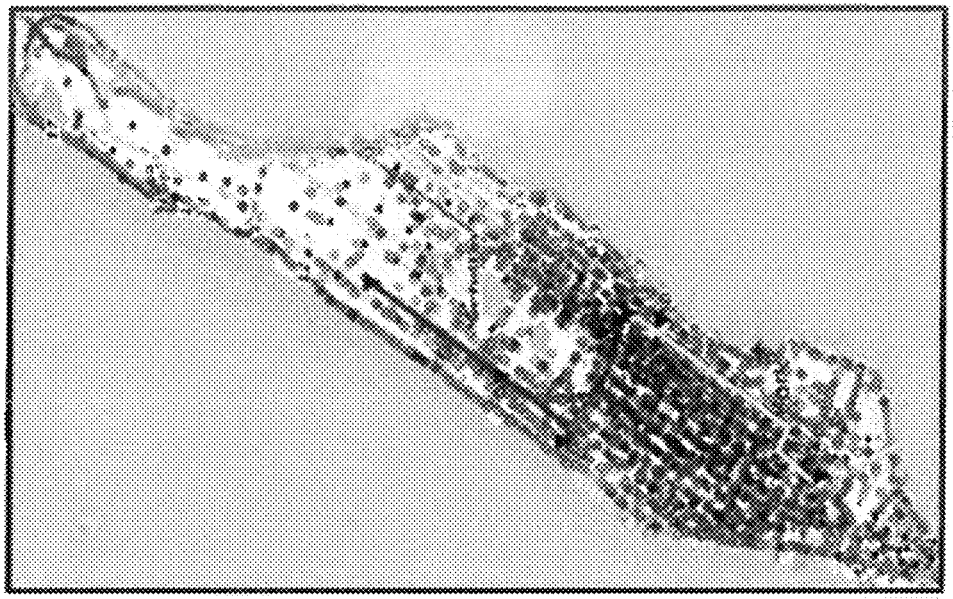
FIG. 3A is an illustration of a geographic region having 2,000 vehicles, capacity of 4.

FIGS. 3A and 3B illustrate an optimal route for a vehicle with four passengers and an additional request.

FIG. 3A is an illustration of a geographic region having 2,000 vehicles, capacity of 4; (=5 min, Wednesday, 2000 hours). Vehicle in the fleet are represented at their current positions. Colors indicate number of passengers (0: light blue; 1: light green; 2: yellow; 3: dark orange; 4: dark red); 39 rebalancing vehicles are displayed in dark blue—mostly in the upper Manhattan returning to the middle.

FIG. 3B is an enlarged view of a portion of the geographic region illustrated in FIG. 3A showing a close view of the scheduled path for a vehicle (dark red circle) with four passengers, which drops one off, picks up a new one (blue star), and drops all four. Drop-off locations are displayed with inverted triangles.

It should be noted that the number of variables in the ILP is equal to the number of edges e(T,v) in the RTV-graph plus the number of requests. In the worst case, the number of variables is of order O(mnv) but only reached with complete RV- and RTV-graphs, where all vehicles can serve all requests and all requests can be combined with each other. In practice, the number of variables is orders of magnitudes lower and related to the size of the cliques in the RV-graph. The number of constraints is n+m.

If all of the steps are executed until termination and exploration of all possible trips and assignments, the described method guarantees optimality of the assignment of the currently active requests, while satisfying the constraints Z. In practice, timeouts can be set both for the amount of time spent generating candidate trips for each vehicle and for the time spent exploring the branches of the ILP. A limit on the number of vehicles considered per request, the number of trips per vehicle, or the optimality gap of the ILP can also be set. These timeouts trade optimality for tractability, and the particular values selected will depend upon the available resources. It should be noted that the described method is reactive in the sense that it provides anytime-optimality guarantees given the current state of the system and the current requests. To inform the assignment and routing about future demand, an additional cost term could be added to Eq. 1, and future requests could be sampled from historical data. The method allows for parallelization in all steps.

In one illustrative system, the performance of a MoD fleet controller using the technique described herein against real data from an arbitrarily chosen representative week, from 0000 hours Sunday, May 5, 2013, to 2359 hours, Saturday May 11, 2013, from a publicly available dataset of taxi trips in Manhattan, New York City is next described. This dataset contains, for each day, the time and location of all of the pickups and drop-offs executed by each of the 13,586 active taxis. From these data, all of the requests (origin and destination within Manhattan) are extracted and the time of request is considered equal to the time of pickup. In this example, the complete road network of Manhattan (4,092 nodes and 9,453 edges) is considered, with the travel time on each edge (road segment) of the network given by the daily mean travel time estimate, computed using a conventional method which may be the same as or similar to the method described in Santi P, et al. (2014) Quantifying the benefits of vehicle pooling with shareability networks. *Proc Natl Acad Sci USA* 111(37):13290-13294. Shortest paths and travel times between all nodes are then precomputed and stored in a lookup table.

In one simulation of the evolution of a taxi fleet, vehicles were initialized at midnight at sampled positions from a historical demand distribution and continuously travel to pick up and drop off passengers to satisfy the real requests extracted from a dataset. Requests were collected during a 30 second time window after which the requested were assigned in batch to the different vehicles. Past requests are kept in the requests pool until picked up and can be reassigned if a better match is found before pickup. Each day contains between 382,779 (Sunday) and 460,700 (Friday) requests, and the running pool of requests contains up to 2,000 requests at any given time. It such a simulation it has been found that the system and methods described herein are robust both with respect to the chosen time window and the density of demands. This is particularly true with results having a time window between 10 and 50 seconds, and having half/double the amount of requests (~220,000/~880,000 per day) in New York City.

Further, several metrics were analyzed, with different vehicle fleet sizes (m∈1,000, 2,000, 3,000} vehicles), vehicle capacities (X∈{1, 2, 4, 10} passengers), and maximum waiting times (ω∈{120, 300, 420} seconds). The maximum trip delay Δ is double the maximum waiting time and includes both the waiting time ω and the inside-the-vehicle travel delay. The analysis shows that, thanks to high capacity ride-sharing, a reduced fleet of vehicles (below 25% of the active taxis in New York City) is able to satisfy 99% of the requests, with a mean waiting time and delay of about 2.5 min. All results include rebalancing of idle vehicles to unassigned requests. Experimentally, it is observed that the rebalancing process contributed an increase in the service rate of about 20% and that high vehicle occupancy is achieved in times of high demand, with a large number of the trips being shared. It is observed that many vehicles are located in mid-Manhattan and contain three or four passengers.

Referring now to FIGS. 4A-4D, shown are a series of plots of mean number of passengers per vehicle vs. time for four different vehicle types (capacity one, two, four, and ten). FIGS. 4A-4D show four one-week time series for different fleet sizes and maximum waiting time: (A) 1000 vehicles and =2 min; (8) 1000 vehicles and =7 min; (C) 3000 vehicles and =2 min; and (D) 3000 vehicles and =7 min. At night, most vehicles wait, and during rush hour, the mean occupancy decreases as the fleet gets larger. Larger maximum waiting time enables more opportunities for ride-sharing.

FIGS. 4A-4D thus illustrate that occupancy depends upon the fleet size, capacity, and the maximum waiting/delay time. Lower fleet size, larger capacity and longer waiting/delay times increase the possibilities for ride-sharing and lead to higher mean vehicle occupancy.

Figure 5A:
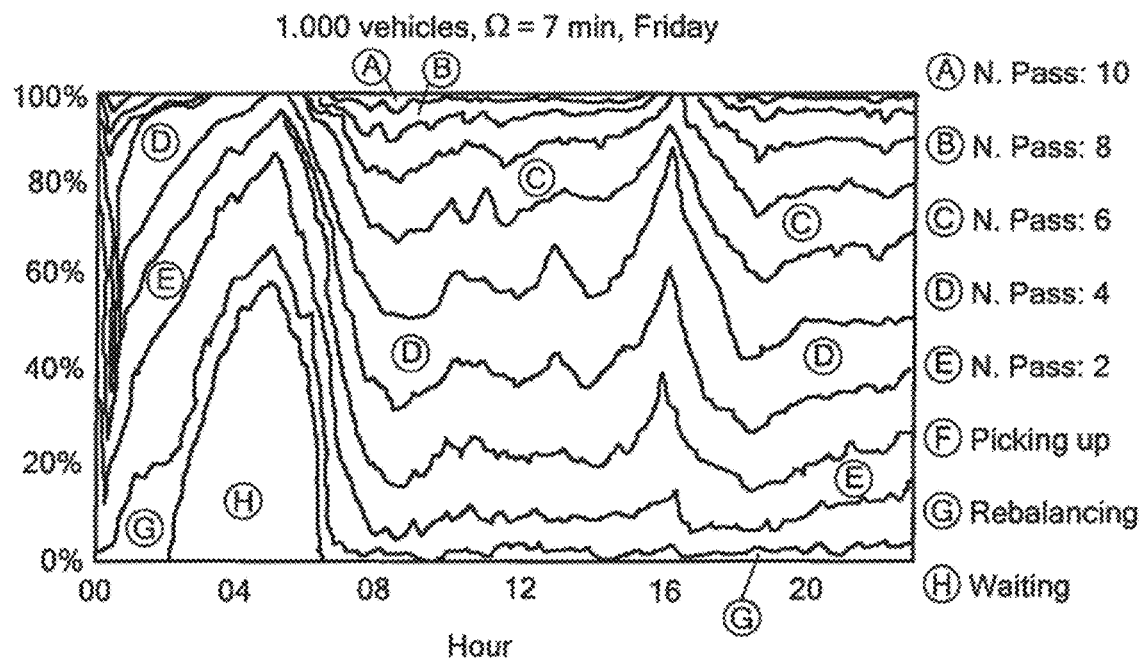
FIG. 5A is a plot of percentage of vehicles in each state (waiting, rebalancing, and number of passengers) vs. time for a representative day (Friday 0000 hours to 2400 hours) with a fleet of 1,000 vehicles of capacity 10 with many opportunities for ride-sharing in high-capacity vehicles.
Figure 5B:
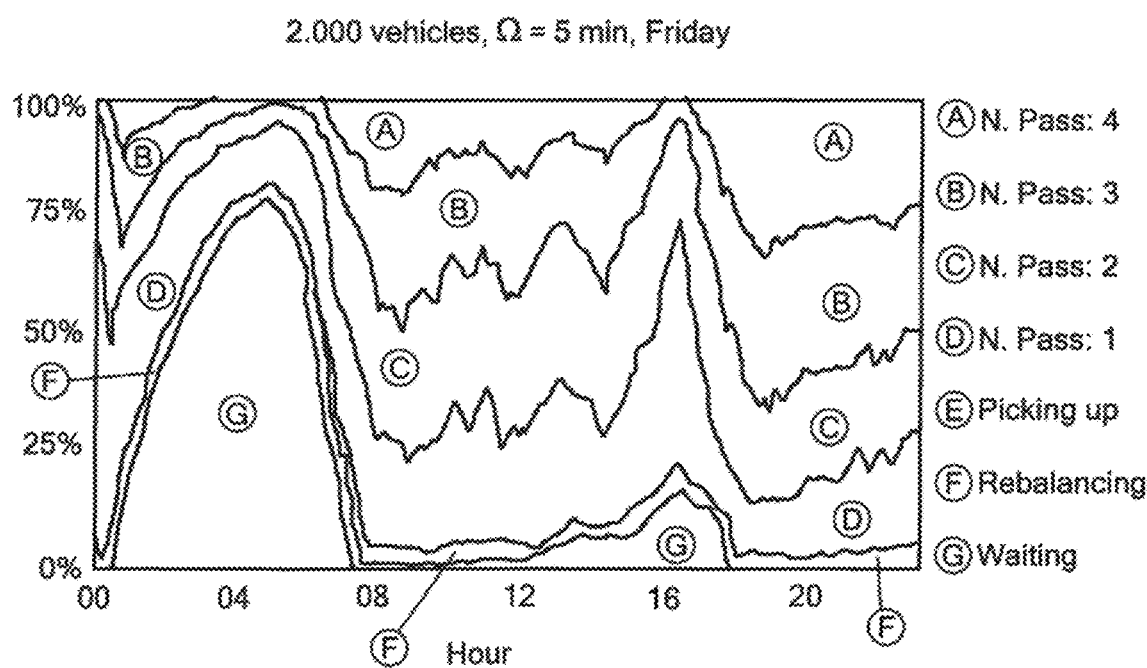
FIG. 5B is a plot of percentage of vehicles in each state (waiting, rebalancing, and number of passengers) vs. time for a representative day with a fleet of 2,000 vehicles of capacity four.

FIGS. 5A, 5B illustrate the percentage of vehicles in each state (waiting, rebalancing, and number of passengers) for a representative day (Friday 0000 hours to 2400 hours). (A) A fleet of 1,000 vehicles of capacity 10 with many opportunities for ride-sharing in high-capacity vehicles. (B) A fleet of 2,000 vehicles of capacity four, showing the utility of full vehicle-sharing.

In FIGS. 5A, 5B, it is observed that during peak hours, a small fleet of high-capacity vehicles does indeed operate at high occupancy. For a fleet of 1,000 vehicles of capacity 10, one observes that, during peak time (1800 hours) of a Friday, 10% of the vehicles have eight or more passengers, 40% of the vehicles have six or more, 80% have three or more, and 98% have at least one passenger. For a fleet of 2,000 vehicles of capacity four, it is observed that, at the same peak time, over 70% of them have at least three passengers onboard.

It is observed that the value of fleets with larger passenger capacities increases with larger Ω and Δ values, as expected, because passengers are willing to incur a larger personal time penalty. High-capacity vehicles are also more important when the fleet size is smaller, because seating capacity might be a bottleneck with smaller fleets.

It is also observed that increasing the vehicle capacity not only increases the service rate but also reduces the mean distance traveled by the vehicles in the fleet (FIG. 6D), potentially leading to a reduction in costs, congestion, and pollution. It is also observed that, with the method described herein (which may be implemented as an online method), about 90% of the rides were shared. The number of shared rides slightly increases with A and decreases with the fleet size (FIG. 6E). Finally, it is noted that the system and techniques described herein are real-time capable (FIG. 6F). In the examples described herein, for 300 s, the method is executed in less than 30 s, which is the period for which requests are collected.

FIGS. 6A-6F are a series of plots which may be used to compare several different performance metrics vs. maximum waiting time for varying vehicle capacity (1, 2, 4, and 10 passenger) and varying fleet sizes (fleet sizes of 1,000, 2,000, and 3,000 vehicles).

It should be appreciated that each of FIGS. 6A-6E include three subplots. The subplots included in each of FIGS. 6A-6E are for fleet sizes of 1,000, 2,000, and 3,000 vehicles, respectively. The coordinate axes show increasing maximum waiting time Ω of 2, 5, and 7 min.

Figure 6A:
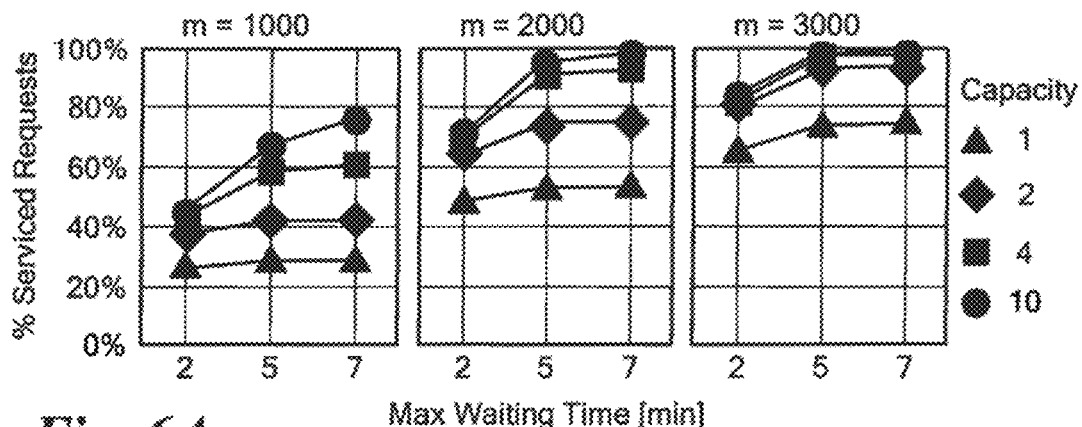
FIG. 6A is a plot of percent of serviced requests vs. maximum waiting time for varying vehicle capacity (1, 2, 4, and 10 passenger) and varying fleet sizes (fleet sizes of 1,000, 2,000, and 3,000 vehicles)

FIG. 6A is a plot of percent of serviced requests vs. maximum waiting time for varying vehicle capacity (1, 2, 4, and 10 passenger) and varying fleet sizes (fleet sizes of 1,000, 2,000, and 3,000 vehicles).

As illustrated in FIG. 6A, a fleet of 1,000 vehicles with a capacity of 10 can satisfy almost 80% of the requests with =420 s, compared with below 30% for a single-rider taxi, for a net gain of over 50%. However, with a larger fleet of 3,000 vehicles and =120 s, the benefit is only about 15%. Interestingly, if longer waiting times and delays are allowed, =420 s, a fleet of 3,000 vehicles with a capacity of 2, 4, and 10 could serve 94, 98, and 99% of the demand. To achieve 98% service rate, a fleet of just 2,000 vehicles with a capacity of 10 was required, which represents a reduction of the fleet size to 15% of the active taxi fleet in New York City.

Figure 6B:
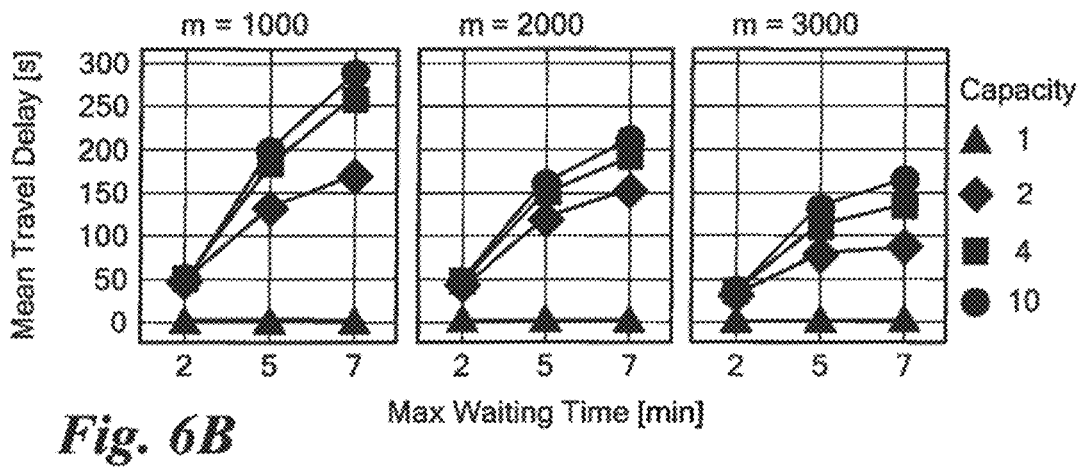
FIG. 6B is a plot of average in car delay δ−ω vs. maximum waiting time for varying vehicle capacity (1, 2, 4, and 10 passenger) and varying fleet sizes (fleet sizes of 1,000, 2,000, and 3,000 vehicles)

FIG. 6B is a plot of average in car delay δ–ω vs. maximum waiting time for varying vehicle capacity (1, 2, 4, and 10 passenger) and varying fleet sizes (fleet sizes of 1,000, 2,000, and 3,000 vehicles).

Figure 6C:
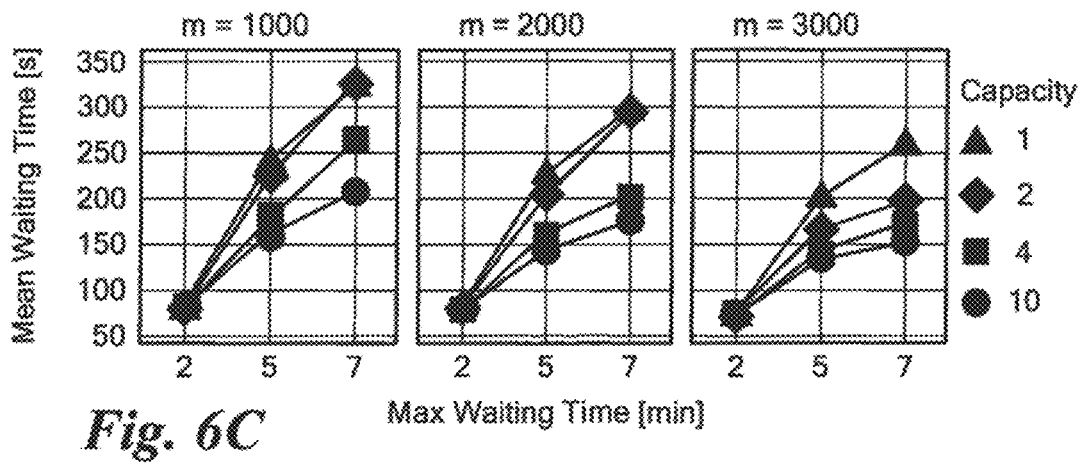
FIG. 6C is a plot of average waiting time ω, vs. maximum waiting time for varying vehicle capacity (1, 2, 4, and 10 passenger) and varying fleet sizes (fleet sizes of 1,000, 2,000, and 3,000 vehicles)

FIG. 6C is a plot of average waiting time ω, vs. maximum waiting time for varying vehicle capacity (1, 2, 4, and 10 passenger) and varying fleet sizes (fleet sizes of 1,000, 2,000, and 3,000 vehicles).

As expected, the in-car travel delay does increase with the increase in vehicle capacity (FIG. 6B). Nonetheless, that increase seems practically negligible—well below 100 s—once ride-sharing is allowed. Furthermore, the mean waiting time does in fact decrease as vehicle capacity is increased (FIG. 6C). For a fleet size of 1,000 vehicles and =420 s, high-capacity vehicles not only improved the service rate but also achieved a reduction in mean waiting time of over 100 s, which partially offsets the increased in-car delay. In particular, one observes that 3,000 vehicles with a capacity of 2 and 4 could serve 94 and 98% of the demand, with a mean waiting time of 3.2 and 2.7 min and a mean delay of 1.5 and 2.3 min, respectively. To achieve 98% service rate, with comparable waiting time (2.8 min) and delay (3.5 min), a fleet of just 2,000 vehicles with a capacity of 10 was required.

Figure 6D:
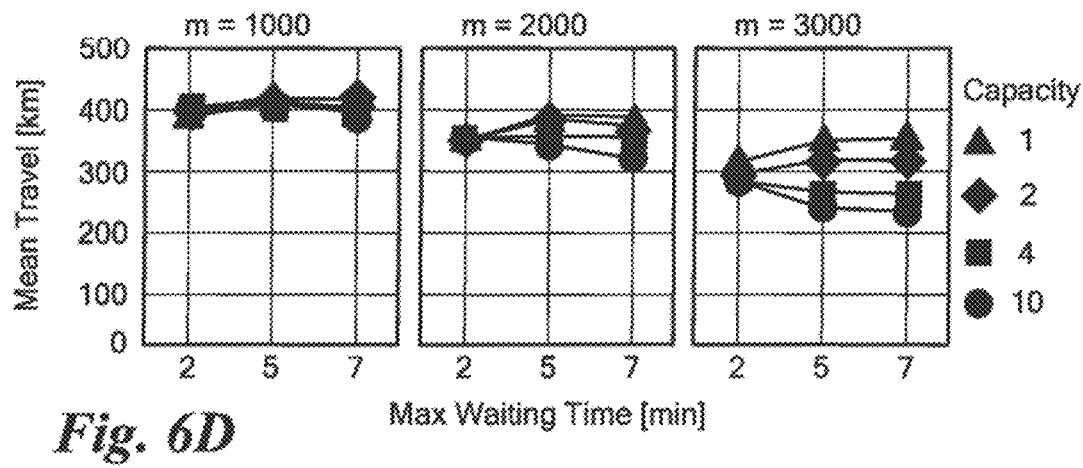
FIG. 6D is a plot of average distance traveled by each vehicle during a single day vs. maximum waiting time for varying vehicle capacity (1, 2, 4, and 10 passenger) and varying fleet sizes (fleet sizes of 1,000, 2,000, and 3,000 vehicles)
Figure 6E:
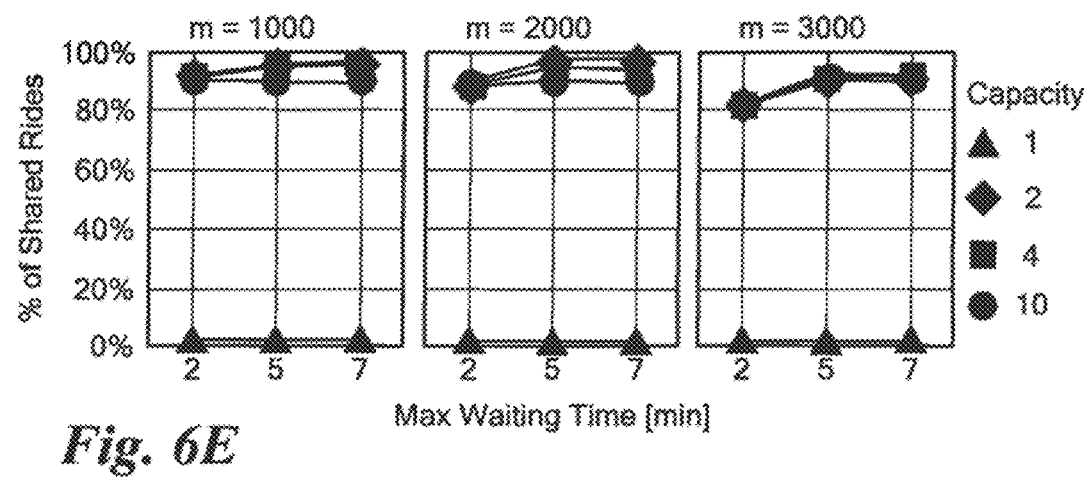
FIG. 6E is a plot of percentage of shared rides (number of passengers who shared a ride divided by the total number of picked-up passengers) vs. maximum waiting time for varying vehicle capacity (1, 2, 4, and 10 passenger) and varying fleet sizes (fleet sizes of 1,000, 2,000, and 3,000 vehicles)
Figure 6F:
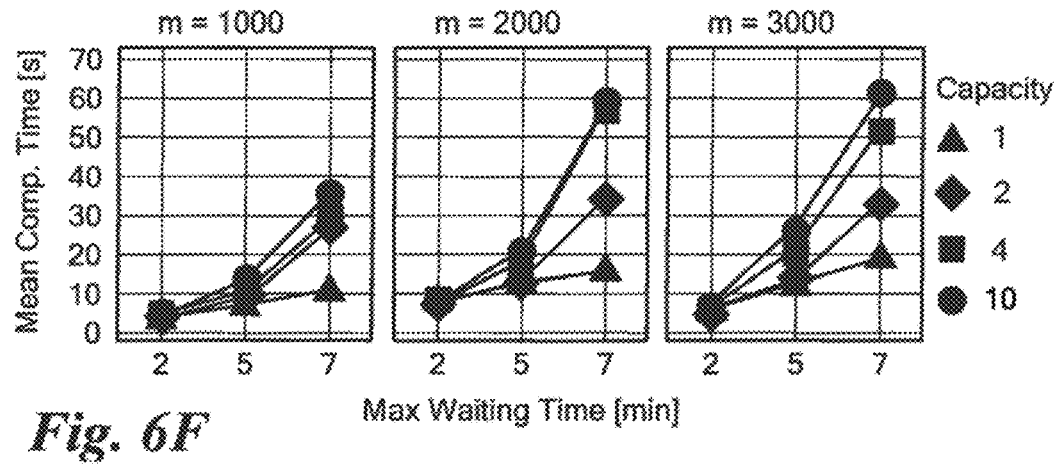
FIG. 6F is a plot of average computational time for a thirty (30) second iteration of the method described herein including computation of the RV-graph, computation of the RTV-graph, ILP assignment, rebalancing, and data writing.

FIG. 6D is a plot of average distance traveled by each vehicle during a single day vs. maximum waiting time for varying vehicle capacity (1, 2, 4, and 10 passenger) and varying fleet sizes (fleet sizes of 1,000, 2,000, and 3,000 vehicles).

FIG. 6E is a plot of percentage of shared rides (number of passengers who shared a ride divided by the total number of picked-up passengers) vs. maximum waiting time for varying vehicle capacity (1, 2, 4, and 10 passenger) and varying fleet sizes (fleet sizes of 1,000, 2,000, and 3,000 vehicles).

FIG. 6F is a plot of average computational time for a thirty (30) second iteration of the method in a 24 core 2.5 GHz machine, including computation of the RV-graph, computation of the RTV-graph, ILP assignment, rebalancing, and data writing (higher levels of parallelization would drastically reduce this computational time).

In summary, FIGS. 6A-6F illustrate an analysis of: service rate (percentage of requests serviced) (A), average in car delay $\delta-\omega$(B), average waiting time $\omega$ (C), average distance traveled by each vehicle during a single day (D), percentage of shared rides (number of passengers who shared a ride divided by the total number of picked-up passengers) (E), and average computational time for a 30-s iteration of the method (F), in a 24 core 2.5 GHz machine, including computation of the RV-graph, computation of the RTV-graph, ILP assignment, rebalancing, and data writing (higher levels of parallelization would drastically reduce this computational time).

Some parameters used in the simulations described herein are next described.

In practice, a time-out can be set both for the amount of time spent generating candidate trips for each vehicle, and for the amount of time spent exploring the branches of the ILP. Alternatively, one may set a limit on the number of vehicles considered per request, the number of candidate trips per vehicle or the optimality gap of the ILP. These timeouts trade-off optimality for tractability and their values will depend upon the available resources.

To achieve real-time performance it may be necessary to employ a set of timeouts. If allowed to progress past the selected timeout, the method would eventually find the optimal assignment.

In one embodiment, one may implement the function travel (T; v), which computes the optimal route for given trip T and vehicle v, as follows. If the number of passengers and requests is less or equal than four, one perform an exhaustive search to compute the optimal route which satisfies the constraints. If the number of passengers is greater than four, for each additional request one only check the routes that maintain the order of the current passengers in the vehicle.

In the computation of the RV-graph one may set limits on the number of edges. In particular, one compute the complete graph and, for each request, one keep a maximum of 30 links with candidate vehicles, in particular those of lowest trip cost. Speed-ups such as the ones proposed in T-share [4] could be employed in this stage to prune the most likely vehicles to pick up a request.

In the computation of the RTV-graph one may specify a maximum amount of time, per vehicle, to explore potential trips and add edges to the graph. In particular, one used a timeout of 0:2 seconds per vehicle. This leads to sub-optimality of the solution, but faster computation, removing longer trips.

It should be appreciated that the ILP can be solved with state of the art solvers. For example, a MOSEK Optimization Solver from MATLAB may be used. In an embodiment, a MOSEK solver may be used with an optimality gap of 0.1% and a maximum run time of 15 seconds. The MOSEK solver employs heuristics in the exploration of the branches of the problem. Other solvers having the same or similar capabilities, may of course, also be used.

Figure 7:
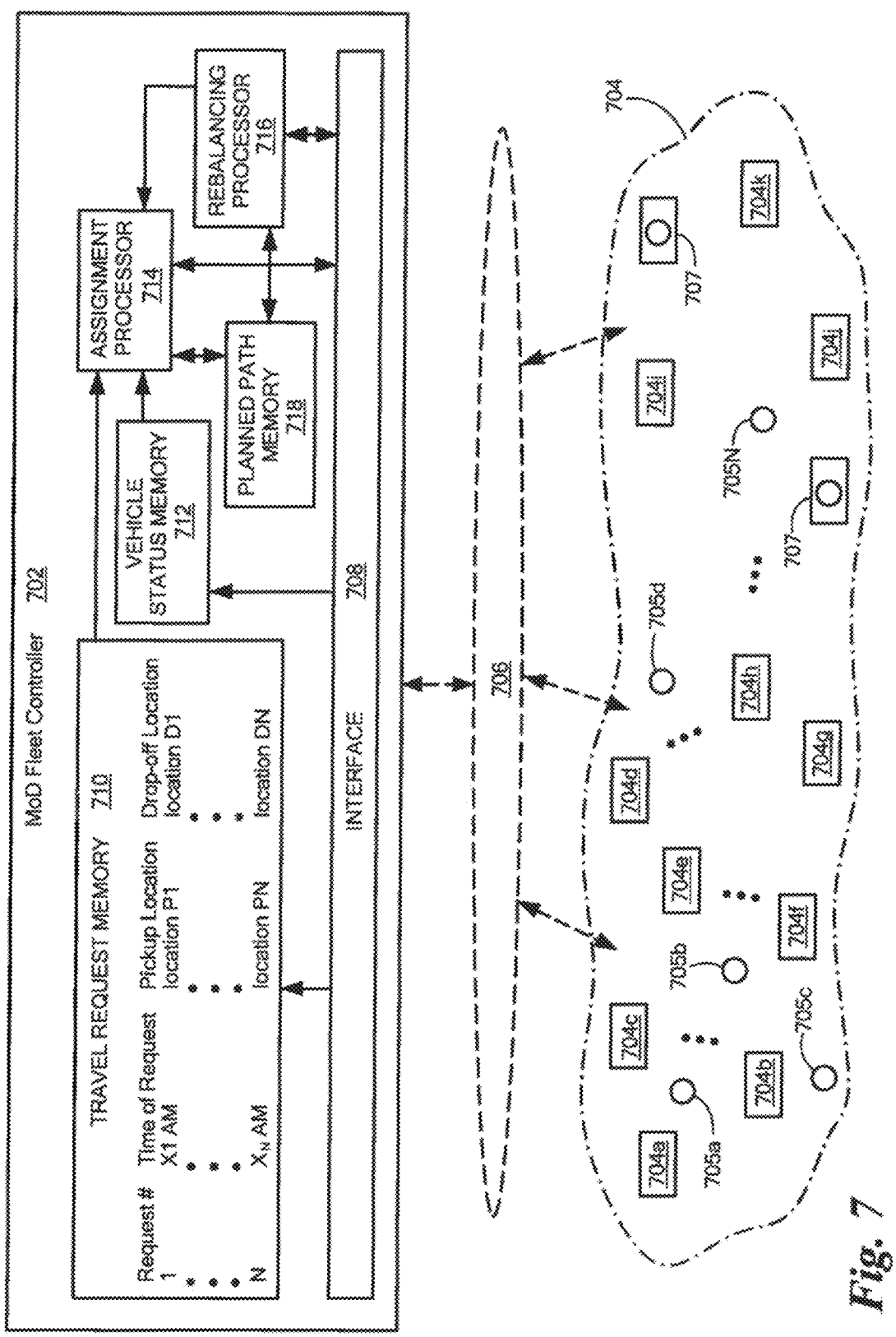
FIG. 7 is a block diagram of a ride sharing system for assigning travel requests to vehicles and finding optimal routes for a vehicle fleet.

Referring now to FIG. 7, a ride sharing system for assigning ravel requests for vehicles and finding optimal routes for one or more vehicles within a fleet of vehicles in response to one or more ride requests includes a MoD fleet controller 702 in communication with one or more vehicles 704a-704k, generally denoted 704, and one or more persons wishing to ride share 705a-705N ang generally denoted 705, through a network 706. Network 706 may, for example, be an internet or any other type of network capable of supporting communication between MoD fleet controller 702 and vehicles and ride sharing persons 704, 705.

The MoD fleet controller includes an interface 708 to the vehicles and requesters. In response to requests provided thereto through interface 708, travel requests are stored in a travel request memory. The travel request may include at least a timer request, a pickup location and a drop off location. Other information may also be part of the travel request such as the number of persons in the party requesting travel. Vehicle 705 provides vehicle status information which is stored in memory 712. The memories 710, 712 are coupled to an assignment processor 714.

In response to the travel request information and vehicle status information provided thereto, the assignment processor assigns travel requests to vehicles and/or finds optimal routes for each assigned vehicle in accordance with the techniques described hereinabove in conjunction with FIGS. 1-6F.

MoD fleet controller 702 further includes a vehicle plan memory 718 which receives information via interface 708 and which has two-way communication paths with the assignment and rebalancing processors 714, 716. Planned path memory 718 receives and stores planned path and pickup/drop-off schedules for occupied vehicles. For example, for vehicles with occupants denoted 707, information related to a planned path and drop-off/pickup schedule is stored in a memory 718. Thus, MoD fleet controller is able to track and process information related to travel requests, vehicle status and planned path and drop-off/pickup schedules. This information may be used by assignment and rebalancing processors to track vehicle paths (for example) and use such information in future request-vehicle assignments as well as in the rebalancing process.

In embodiments, MoD fleet controller 702 may also further include a rebalancing processor 716. Upon completion of one or more assignments, it is possible that more vehicles are located in a region having less requests than are needed for the number of vehicles in that location. For example, such imbalances may occur when idle vehicles are in areas far away from an area of current requests and/or due to the maximum waiting time and/or delayed constraints and/or vehicle capacity. To rebalance the vehicle fleet, upon completion of one or more assignments some vehicles are geographically repositioned to a location which allows all travel requests to be serviced while reducing and ideally minimizing travel times.

Next described is a method and system for vehicle routing and multi-request multivehicle assignment that takes into account a prediction of the future demands. Before describing such a method and system is detail, some introductory notations employed throughout the below description as well as problem formulation and an overview of the method and system are described.

Considered herein is a fleet $\nu$ of m vehicles of capacity v, the maximum number of passengers each vehicle can have at any given time. A set of vehicles V is denoted as $\nu=$ $\{v_1, \ldots, v_m\}$. The current state of a vehicle $v$ is given by a tuple $\{q_v, t_v, P_v\}$ indicating its current position $q_v$, the current time $t_v$ and its passengers $P_v = \{p_1, \ldots, p_{n_v^{pass}}\}$. A passenger p is a request that has been picked-up by a vehicle.

Also considered are a set of travel requests (or more simply "requests") $\mathcal{R} = \{r_1, \ldots, r_n\}$. Where each travel request comprises the time of request, a pick-up location and a drop-off location. Formally, a request r is defined by a tuple for; $\{o_r, d_r, t_r^r, t_r^{pl}, t_r^p, t_r^d, t_r^*\}$, indicating its origin $o_r$, its destination $d_r$, the time of the request $t_r^r$, the latest acceptable pick-up time $t_r^{pl}$ (initially given by $t_r^{pl} = t_r^r + \Omega$ with $\Omega$ the maximum waiting time), the pick-up time $t_r^{pl}$, the expected drop off time $t_r^d$, and the earliest possible time at which the destination could be reached $t_r^* = t_r^r + \tau(o_r, d_r)$.

Given a graph of the streets with estimated travel times, a function $\tau(q_1, q_2)$ computes the travel time from $q_1$ to $q_2$, two positions in space encoded by their latitude and longitude coordinates. When a network representation of the map is available, standard techniques for efficiently computing shortest paths can be used.

Further a trip T may be defined as $T = \{r_1, \ldots, r_{n_t}\}$ as a set of requests that can be combined and served by a single vehicle. A trip may have one or more candidate vehicles for execution and contain more requests than the capacity of the vehicle if they are picked and dropped off in a way that the capacity limit is satisfied at all times.

With respect to problem formulation a first problem (referred to herein as problem 1 or the problem of informed batch assignment) may be formulated as follows by considering a set of requests R, a set of vehicles V at their current state including passengers, and a function to compute travel times on the road network. Compute an optimal assignment $\Sigma$ of requests to vehicles may be computed that satisfies a set of constraints Z, including a maximum capacity v of passengers per vehicle, and that minimizes a cost function $C = C_{now} + C_{future}$, where $C_{now}$ could be the sum of travel delays for the current passengers and requests and $C_{future}$ is a term which includes the cost of satisfying future predicted travel requests.

The formulation is flexible with respect to physical and performance-related constraints Z. In one illustrative implementation the following performance-related constraints are considered: for each request r, the waiting time $w_r$, given by the difference between the pick-up time $t_r^p$, and the request time $t_r^r$, must be below a maximum waiting time $\Omega$, for example 5 minutes; for each request r (or passenger p) the total travel delay $\delta_r = t_r^d - t_r^* (\delta_p = t_p^d - t_p^*)$ must be lower than a maximum travel delay $\Delta$, for example 10 minutes, where $t_r^d$ is the drop-off time and $t_r^* = t_r^r + \tau(o_r, d_r)$ t is the earliest possible time at which the destination could be reached if the shortest path between the origin $o_r$ and the destination $d_r$ was followed without any waiting time while the total travel delay $\delta_r$ includes both the in-vehicle delay and the waiting time; and for each vehicle v, a maximum number of passengers, $n_v^{pass} \leq v$, for example capacity ten.

Ideally, all requests shall be assigned to a vehicle, but given the constraints, this might not always be the case. The set of requests assigned to a vehicle may be denoted as $\mathcal{R}_{ok}$ and the set of requests that are not served by any vehicle as $\mathcal{R}_{ko}$.

The cost $C_{now}$ of an assignment may be defined as a sum $\Sigma$ of travel delay over all passengers P and all assigned requests plus a large enough cost $c_{ko}$ for each non-assigned request. This may be expressed as shown in Equation (1).

$$C_{now}\left(\sum\right) = \sum_{p \in \mathcal{P}} (t_p^d - t_p^*) + \sum_{r \in \mathcal{R}_{ok}} (t_r^d - t_r^*) + \sum_{r \in \mathcal{R}_{ko}} c_{ko} \quad (1)$$

in which:
$C_{now}$ is the cost of an assignment
$\mathcal{R}_{ok}$ is the set of requests assigned to a vehicle;
$\mathcal{R}_{ko}$ is the set of requests that are not served by any vehicle;
$t_r^d$ is the expected drop off time;
$t_r^*$ is the earliest possible time at which the destination could be reached if the shortest path between the origin $o_r$ and the destination $d_r$ was followed without any waiting time;
P represents the set of all passengers; and
$C_{ko}$ is the cost of a non-assigned request.

To account for the future performance of the system, a new term $C_{future}$, is introduced which is the expected cost of serving future requests (see Equation (7) below). This cost term is based upon the predicted future demand with the objective of achieving a better routing and assignment of the fleet towards the future requests. This will be discussed in further detail below.

For real-time fleet management, the method can be applied to continuous discovery and assignment of incoming requests. The described approach is to perform batch assignment of the requests to the fleet of vehicles within a defined period of time (and preferably a short time span, for example every 30 seconds). Problem 1 is invoked with the predicted state of the fleet at the assignment time and the cumulated requests. Requests that have not been picked-up by a vehicle within the previous assignment round are kept in the pool for assignment.

The method includes first estimating a number of requests from origins of interest to destinations of interest in a given geographic area in a given period of time. In one illustrative embodiment, such estimating may be accomplished by estimating, for at least portions of each time of the day (e.g. for certain particular times of a day) and for at least some days of the week the amount (i.e. the number) of requests from at least some origins (or in some cases even each origin) in the geographic area (e.g. a city) to at least some destinations (or some cases even each destination) in the geographic area. In some embodiments, such estimating may be accomplished by estimating, each time of the day and for each day of the week, the amount of requests from each origin in the city to each destination. This is a probability distribution and, in some embodiments, may be computed from historical data.

Once the probability distribution is computed, the method also comprises solving the informed batch assignment problem (referred to above as "Problem 1"). To do this, during assignment rounds (e.g. at each assignment round) future requests are sampled from the probability distribution. Such future request samples are then introduced into the assignment and routing problem. It should be noted that in embodiments, such future request samples are introduced into the assignment and routing problem with lower cost than the real or actual requests.

Figure 8:
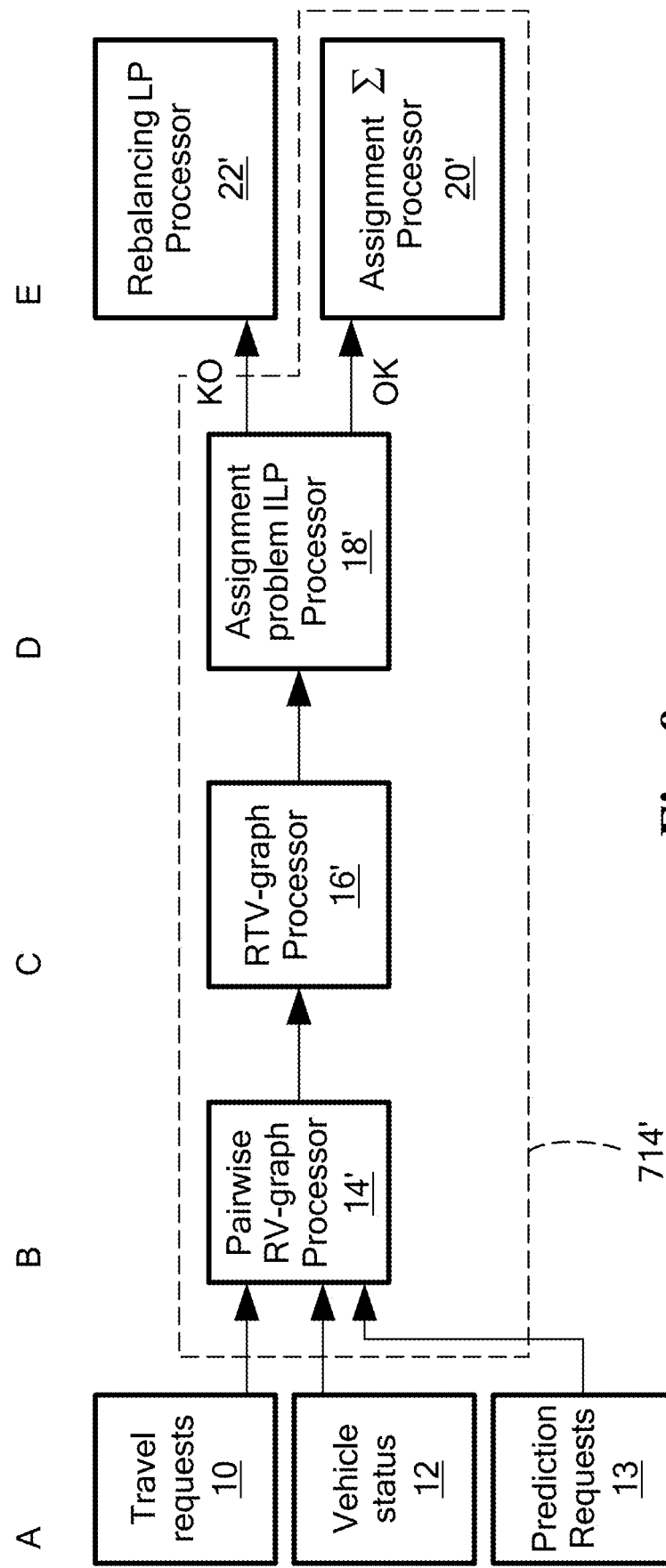
FIG. 8 is a diagram of a system for assigning vehicles to trips that takes into account a predicted demand in both vehicle routing and request-vehicle assignments in the context of ride sharing by utilizing a method for batch assignment of multiple ride requests to multiple vehicles of capacity v taking into account future requests.

In general overview and with reference to FIG. 8 which will be described in detail below, shown is a system for performing an anytime optimal process for batch assignment of a set of requests $R = \{r_1 \ldots r_n\}$ to a set of vehicles $V = \{v_1 \ldots v_m\}$, which: (1) reduces (and ideally minimizes) a cost function C (to be described below); (2) satisfies a set of constraints Z (to be described below); (3) allows for multiple passengers per vehicle; and (4) accounts for future requests. It should be appreciated that the fleet may be the entire set of vehicles but need not be (i.e. the set of vehicles may be some or all of the fleet of vehicles). Also included in a process performed by the system at FIG. 8, is an optional process to rebalance a fleet of vehicles (to which the set of vehicles V belongs). It should be appreciated that rebalancing can be done on the entire fleet of vehicles or less than the entire fleet of vehicles. For example, rebalancing may be done on just the set of vehicles V by driving idle vehicles to areas of high demand, where those vehicles are likely to be required in the future.

Referring now to FIG. 8 is a schematic overview of an illustrative system and method for batch assignment of multiple requests to multiple vehicles of capacity v. The method executed by the system comprises several steps leading to an integer linear optimization which provides an anytime optimal assignment. Significantly, the system and method includes the addition of predicted future requests and a modified formulation of the ILP assignment.

Turning now to FIG. 8, the system and method for batch assignment of multiple ride requests to multiple vehicles of capacity v while taking into account a prediction of the future demands for vehicle routing and multi-request multivehicle assignment begins as shown in processing blocks 10, 12 and 13 in which one or more travel requests 12, one or more indicators of vehicle status 12 and one or more prediction requests 13 are received in a processing element 14'. Each travel request (and in at least in some embodiments prediction requests) includes at least a time of request, a pickup location and a drop-off location. The number of vehicles for which a vehicle status is received may be some or all of the vehicles in the fleet.

After receipt of at least some travel requests and vehicle status indicators, a pairwise request-vehicle graph (RV-graph) processor 14' forms a pairwise request-vehicle graph (RV-graph). As described above in conjunction with FIGS. 1-7, such an RV-graph represents which requests and vehicles might be pairwise-shared, and significantly, also includes the vehicles at their current state and may also account for prediction requests.

A round trip vehicle graph (RTV graph) processor 16' receives the RV-graph information from RV-graph processor 14' and proceeds to generate an RTV graph which takes into account prediction requests. In particular, cliques of the RV-graph (or regions for which its induced subgraph is complete) are explored to find feasible trips and are used to compute the RTV-graph in a manner which may be the same as or similar to that described hereinabove excepting that prediction requests are included when generating the RTV-graph. Suffice it here to say that the RTV-graph is used to determine if a trip is feasible (i.e. the RTV-graph is used to determine whether all of the requests can be picked up and dropped off by some vehicle, while satisfying one or more constraints).

RTV graph processor 16' then provides RV-graph information to an assignment processor 18' in which assignment problem Integer Linear Program (ILP) processing is performed (while again taking into account prediction requests). In embodiments, an anytime optimal technique may be used for batch assignment of a set of requests R= $\{r_1 \ldots r_n\}$ to a set of vehicles V=$\{v_1 \ldots v_m\}$ which: (1) optimizes (and ideally minimizes) a cost function C; (2) satisfies a set of constraints Z; (3) allows for multiple passengers per vehicle; and (4) takes into account future predicted requests.

Solutions from the ILP processor 18' are provided to an assignment processor 20' in which assignment processing (i.e. the actual assigning of requests to vehicles while also taking into account prediction requests) is performed.

Solutions from the ILP processor 18' may also optionally be provided to a rebalancing processor 22' where rebalancing is performed. Such rebalancing also takes into account prediction requests and is accomplished, at least in part, by moving idle vehicles to areas in which those vehicles are likely to be required in the future (i.e. so-called "areas of high demand"). In embodiments, "regions of high demand" may generally be defined as regions where there are more requests than those that can be serviced with the vehicles in the region. It should be appreciated that the concepts and techniques described herein need not consider specifically defined regions, but rather do an assignment of "idle" vehicles to "ignored" requests, where an ignored request is a request that was not assigned to any vehicle in the assignment step. Details of rebalancing are described hereinbelow.

It should also be appreciated that in some instances, it may be possible that only assignment processing is required while in other instances it may be possible that only rebalancing processing while in still other instances assignment processing and rebalancing processing may both be required.

It should also be appreciated that all or some of at least processors 14', 16', 18', 20' may be part of a single processor 714' which may be the same as or similar to processor 714 described in conjunction with FIG. 7 described above. Alternatively, processors 14', 16', 18', 20' may be provided as two or more distributed processors. However, regardless of whether a fleet controller system includes a single processor (e.g. a central processor) or several processors (e.g. several distributed processors) the system can still perform the functionality and operations required to assign, direct and control one or more vehicles within a fleet of vehicles.

Figure 8A:
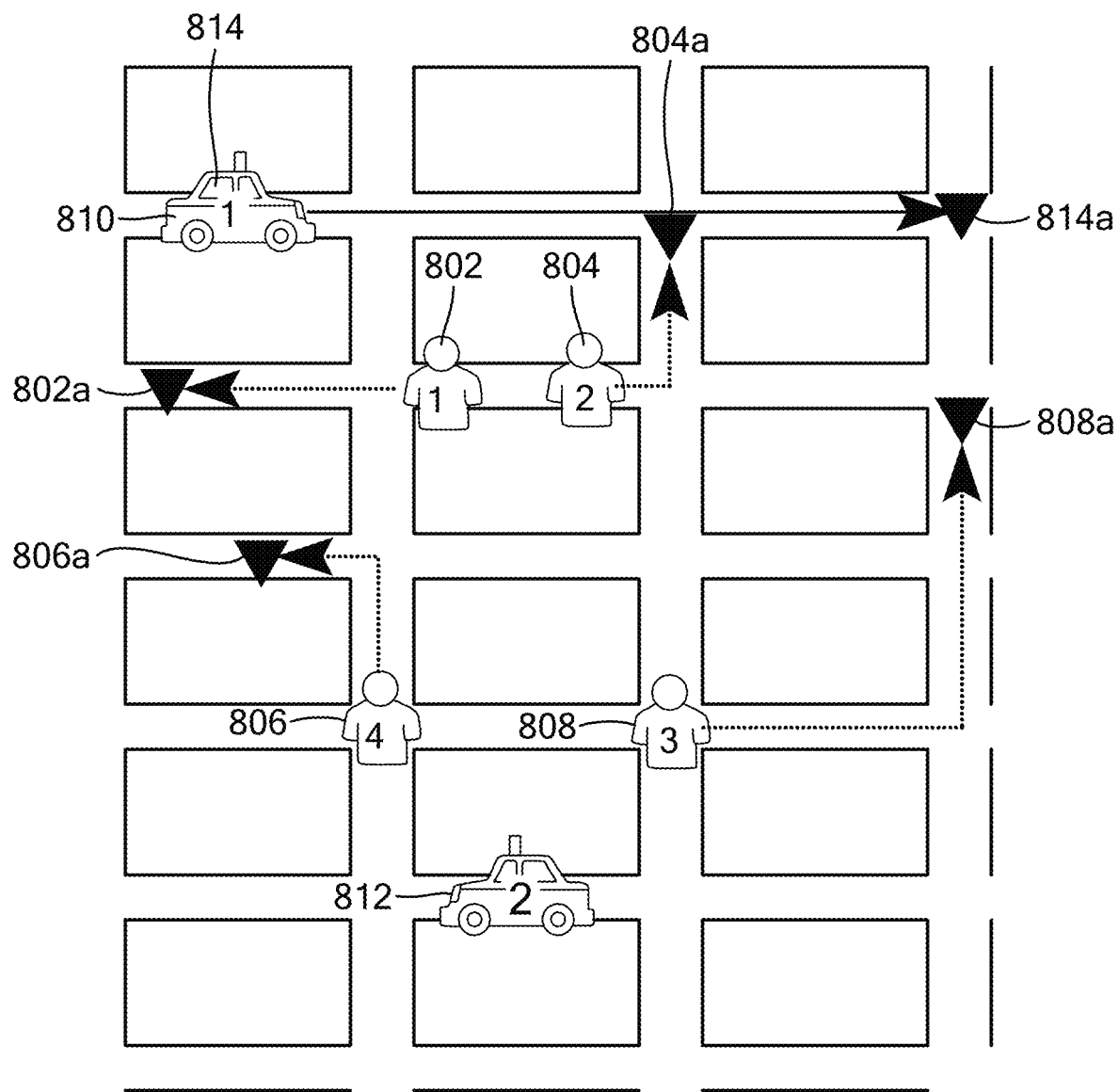
FIG. 8A is an example of a street network with two requests, two predicted requests and two vehicles.

Referring now to FIG. 8A, shown is an example of a street network with two requests (humans 802, 804), two predicted requests (806, 808) and two vehicles 810, 812. In this example, vehicle one 810 has one passenger 814 with a destination 814a and vehicle two is empty.

Humans 802, 804 define the origins of a trip while triangles 802a, 804a identify the respective destinations. Similarly, humans 806, 808 define the origin of the two predicted requests while triangles 806a, 808a identify the respective destinations of the predicted requests.

Figures 8B, 8C:
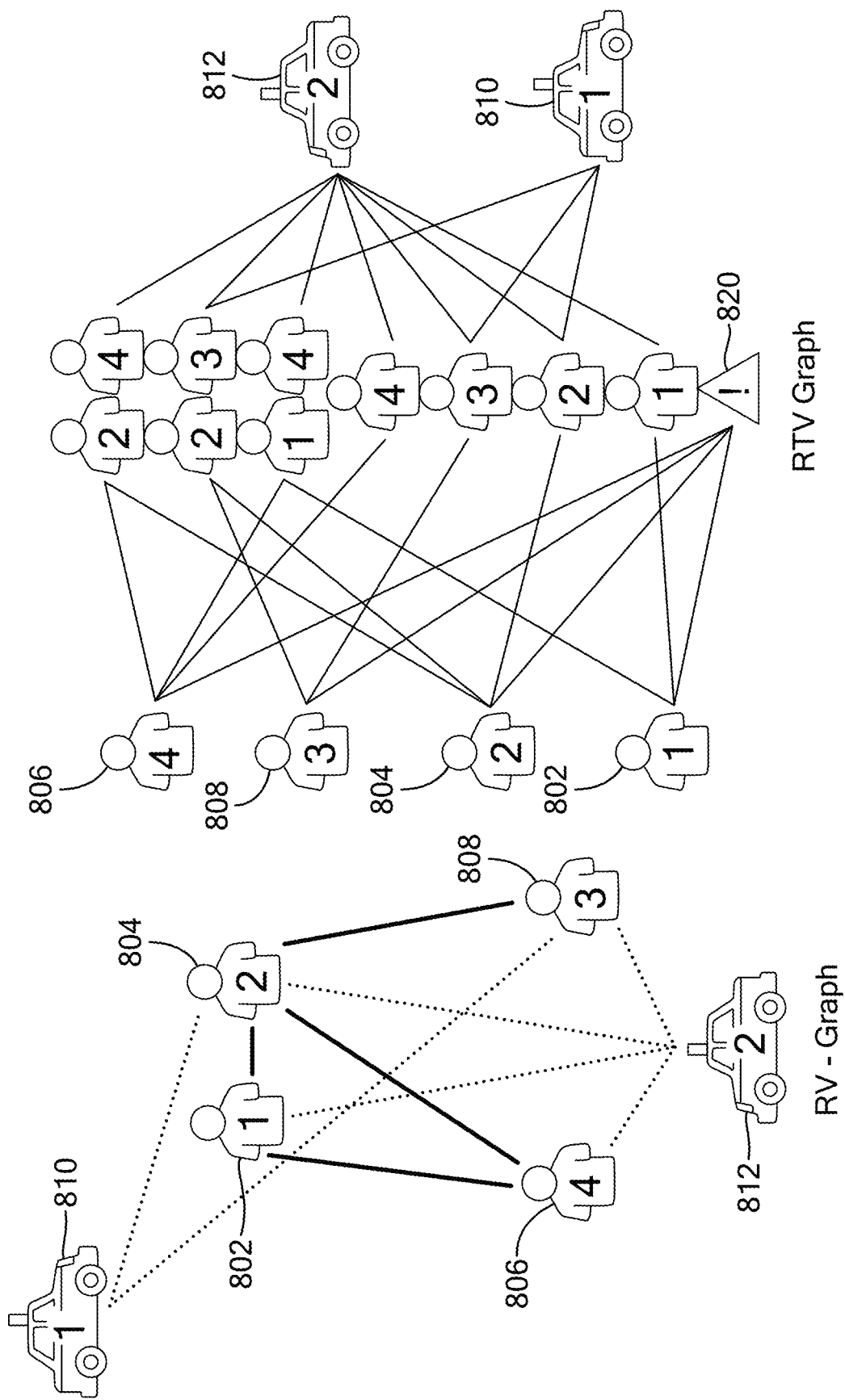
FIG. 8B is an example of a pairwise shareability RV-graph of requests and vehicles with cliques of this graph corresponding to potential trips.
FIG. 8C is an example of an RTV-graph of candidate trips and vehicles which can execute them.

Referring now to FIG. 8B, shown is an example of a pairwise shareability RV-graph generated by an RV processor such as the RV processor 14' of FIG. 8. The RV-graph processor 14' generates an RV-graph of requests and vehicles as illustrated in FIG. 8A. Cliques of this graph are potential trips.

Referring now to FIG. 8C, shown is an example of an RTV-graph generated by an RTV processor such as the RTV processor 16' of FIG. 8. The RTV-graph shows candidate trips and vehicles which can execute them. A node 820 (triangle) is added for requests that cannot be satisfied.

Figure 8D:
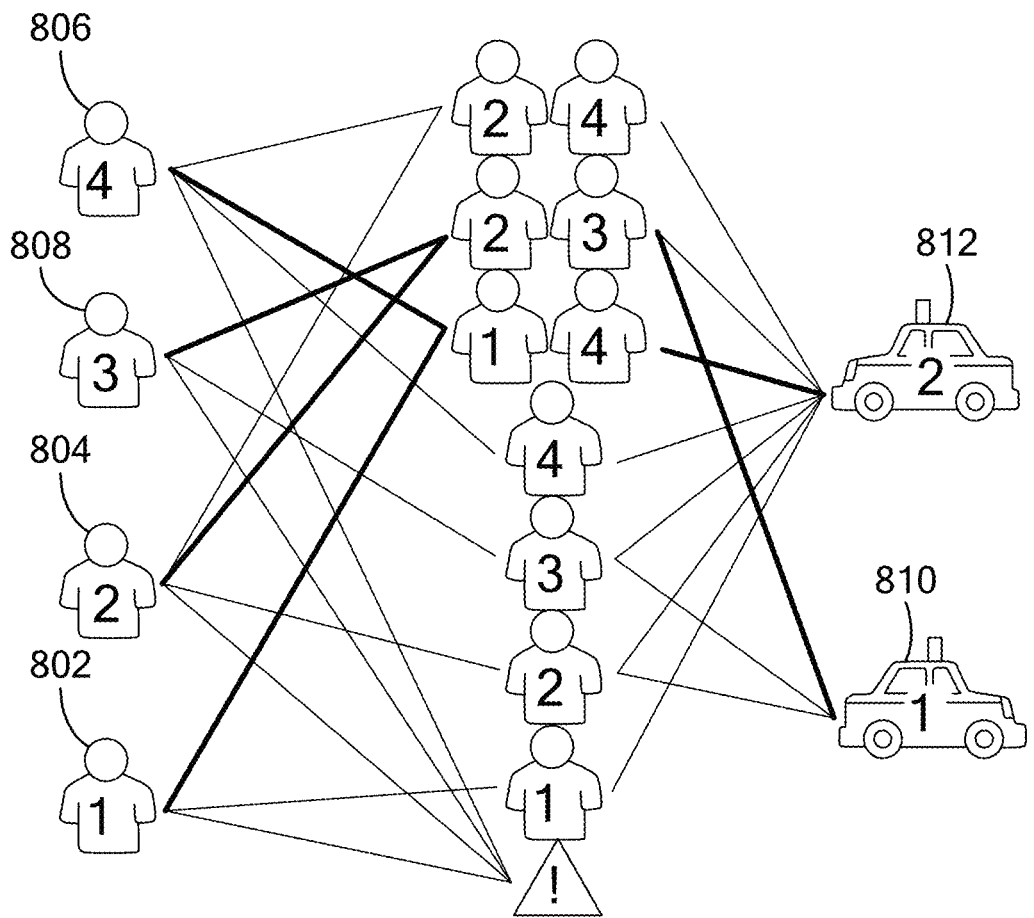
FIG. 8D is an example of an optimal assignment given by the solution of the ILP, where vehicle 1 serves requests 2 and 3 and vehicle 2 serves requests 1 and 4.

Referring now to FIG. 8D, shown is an example of optimal vehicle-passenger assignment given by the solution of an ILP processor such as the ILP processor 18' of FIG. 8, where vehicle 1 serves requests 2 and 3 and vehicle 2 serves requests 1 and 4.

Figure 8E:
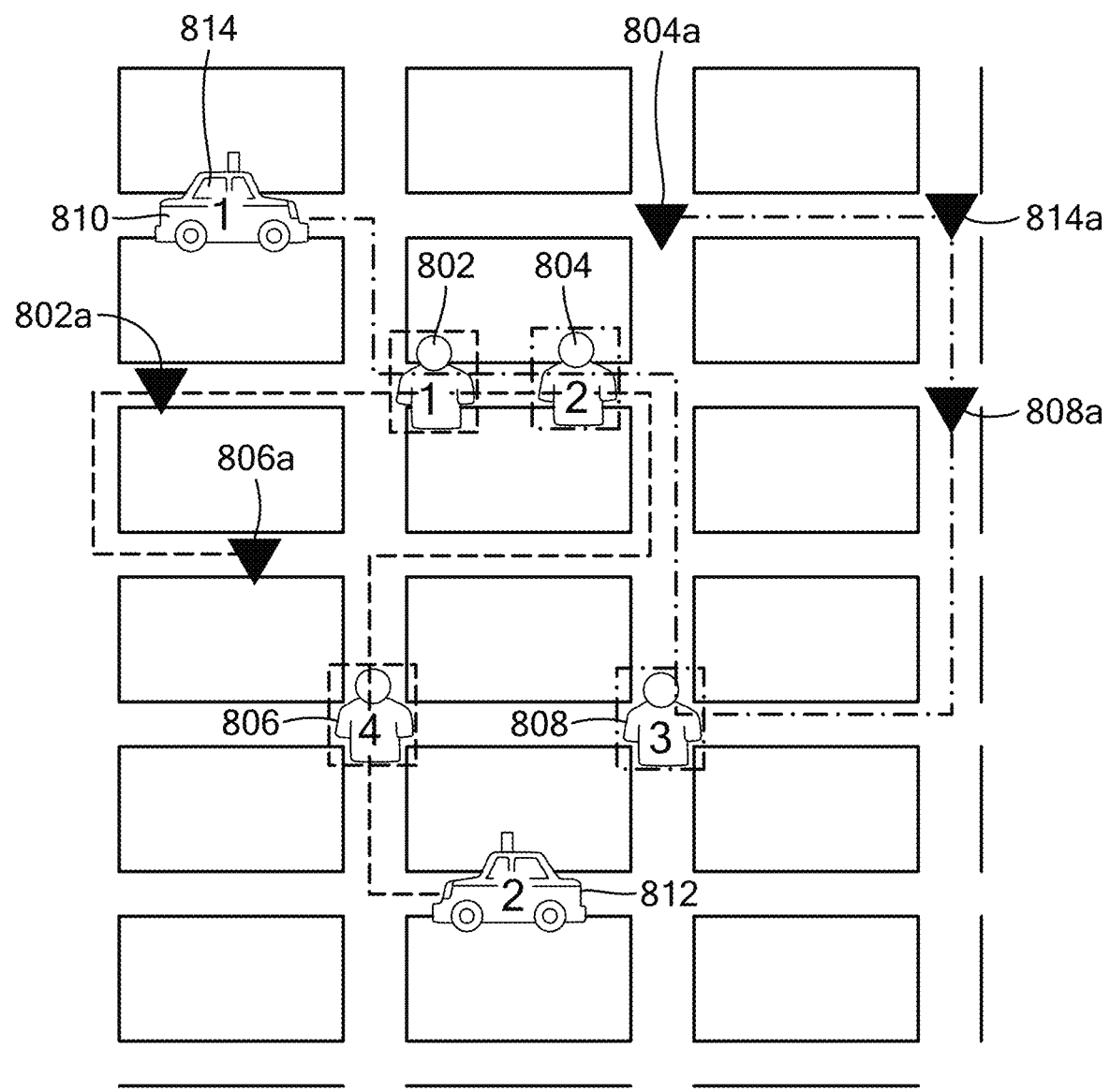
FIG. 8E is an example of a planned route for the two vehicles and their assigned requests shown on FIG. 8A where the predicted requests alter the route of the vehicles, driving them towards areas of likely future requests.
Figure 9:
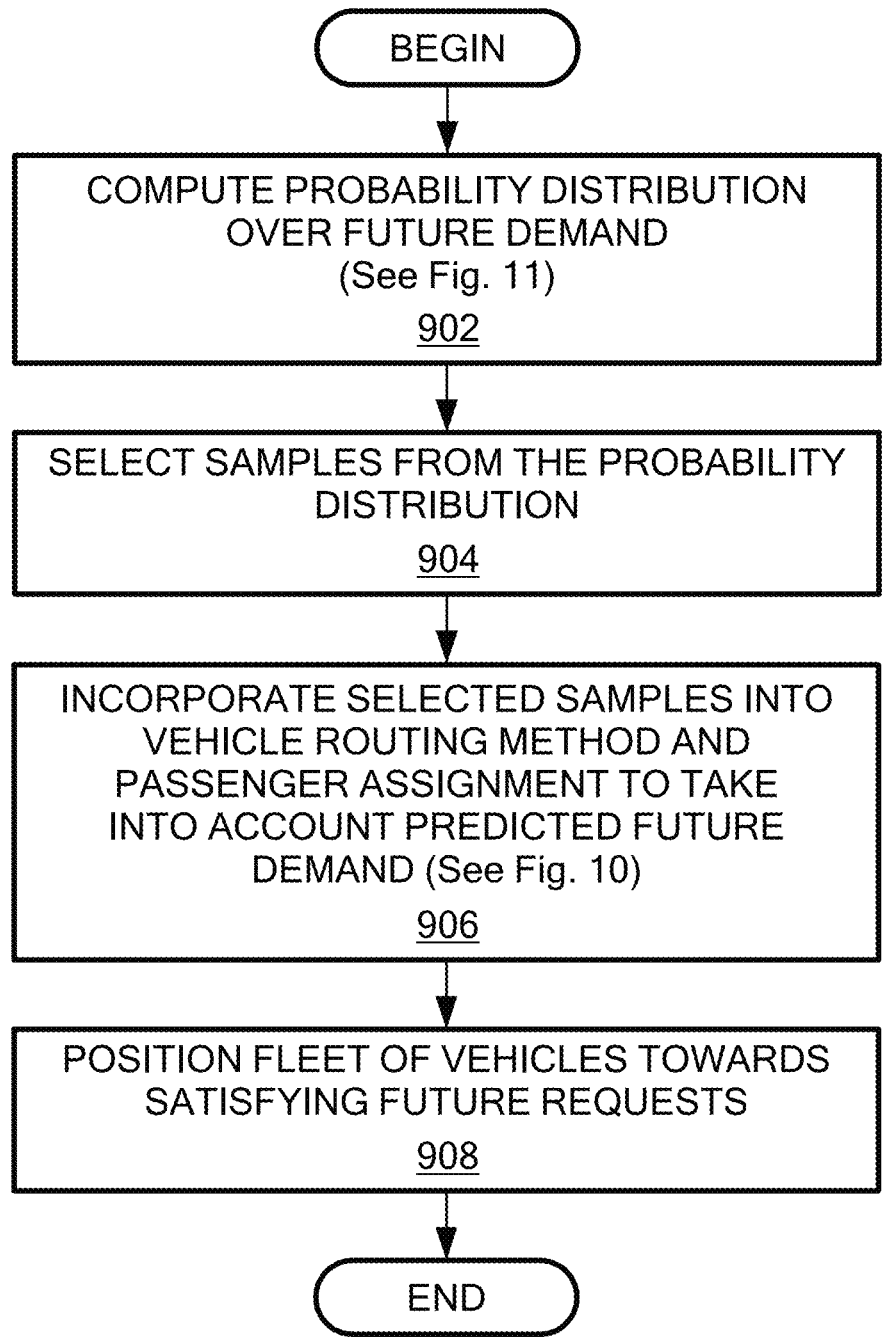
FIG. 9 is a flow diagram of a method for positioning vehicles within a fleet of vehicles taking into account predicted future requests.

Referring now to FIG. 8E, shown is an example of a planned route for the two vehicles and their assigned requests. The predicted requests 806, 808 alter the routes of vehicles 810, 812 such that the vehicles drive towards areas of likely future requests;

Referring now to FIG. 9 within a fleet of vehicles taking into account future predicted request begins in processing block 902 in which a probability distribution over future demand is computed. One illustrative embodiment of such a process is described in detail below in conjunction with FIG. 11.

Processing then proceeds to processing block 904 in which samples are selected from the probability distribution. Once the samples are selected, processing proceeds to processing block 906 in which the selected samples are incorporated into a vehicle routing method and passenger assignment to take into account predicted future demand. Processing then proceeds to processing block 908 in which the position of one or more vehicles within the fleet of vehicles are adjusted to satisfy future requests (e.g. vehicles are positioned taking into account future requests).

Figure 10:
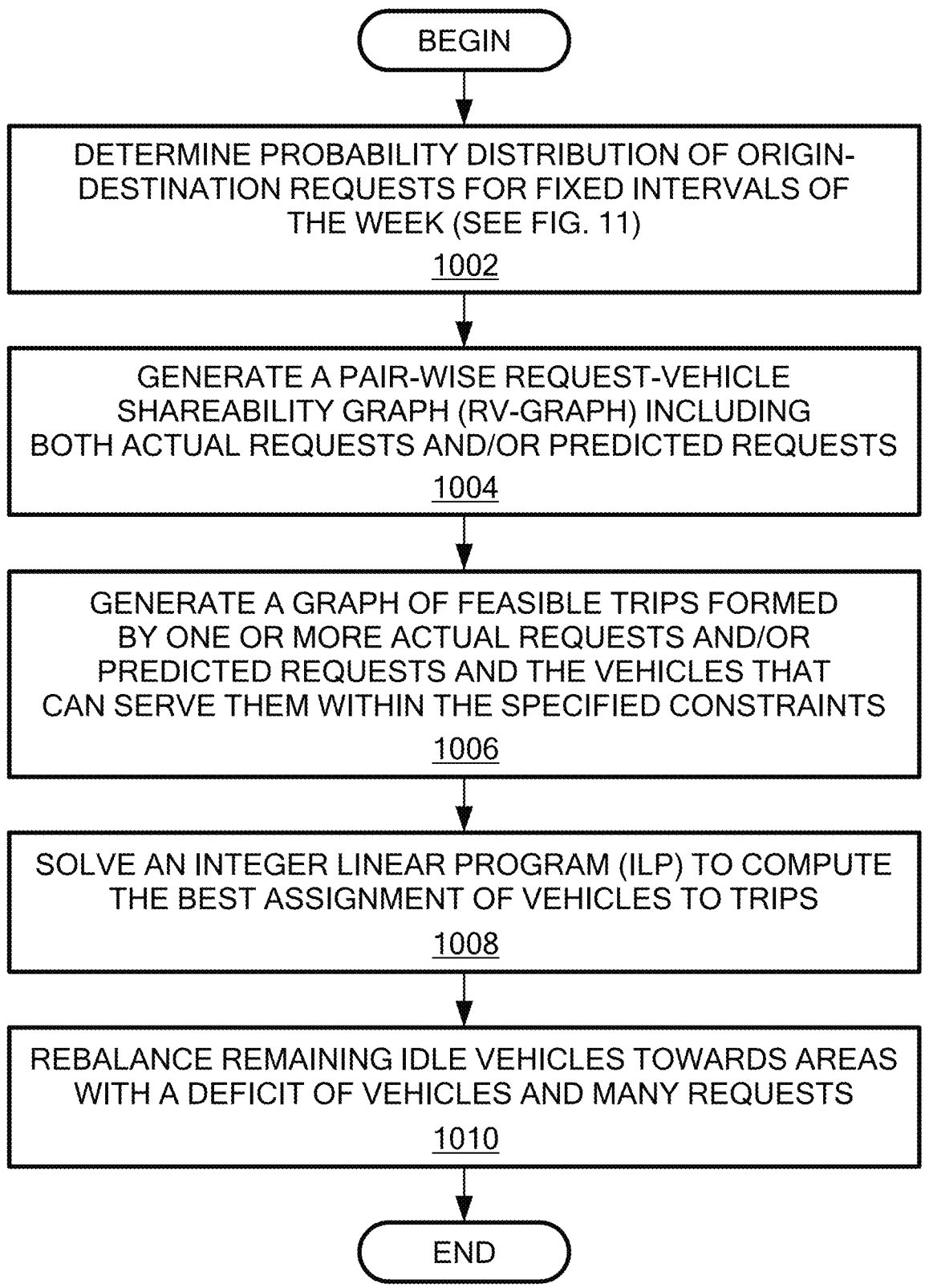
FIG. 10 is a flow diagram of a method for incorporating into a vehicle routing method and passenger assignment selected samples from a probability distribution of predicted future requests.

Referring now to FIG. 10, in general overview, the assignment and routing method may be said to include: computing a pair-wise request-vehicle shareability graph (RV-graph) in which requests r, predicted requests $r^{pred}$ and vehicles v are pairwise connected if r, or $r^{pred}$, can be satisfied by v within the defined constraints and given the current state of v; computing a graph (RTV-graph) of feasible trips (formed by one or more requests and/or predicted requests) and the vehicles that can serve them within the specified constraints; solving an Integer Linear Program (ILP) to compute the best assignment of vehicles to trips; and rebalancing the remaining idle vehicles towards areas with a deficit of vehicles and too many request via a Linear Program (LP).

Given that the problem at hand is NP hard, obtaining an optimal (or near-optimal) assignment can be computationally expensive. For practical applications, it is required that a sub-optimal solution is returned within an allocated run-time budget, which might be improved incrementally up to optimality. The system and technique described herein provides such an "anytime-optimal" property while taking into account future predicted requests.

To take into account future processing requests, a preprocessing step 1002 is performed. In the preprocessing step, a probability distribution of origin-destination requests is computed for fixed intervals. Such fixed intervals may be selected to suit the needs of a particular application. For example, such fixed intervals may correspond to fixed intervals of the week. In embodiments, the probability distribution is computed by discretizing a desired geographic area into regions and cumulating requests from historical data. In one embodiment, requests were cumulated over a year of historical taxi data. Other techniques for determining a probability distribution may also be used.

Figure 11:
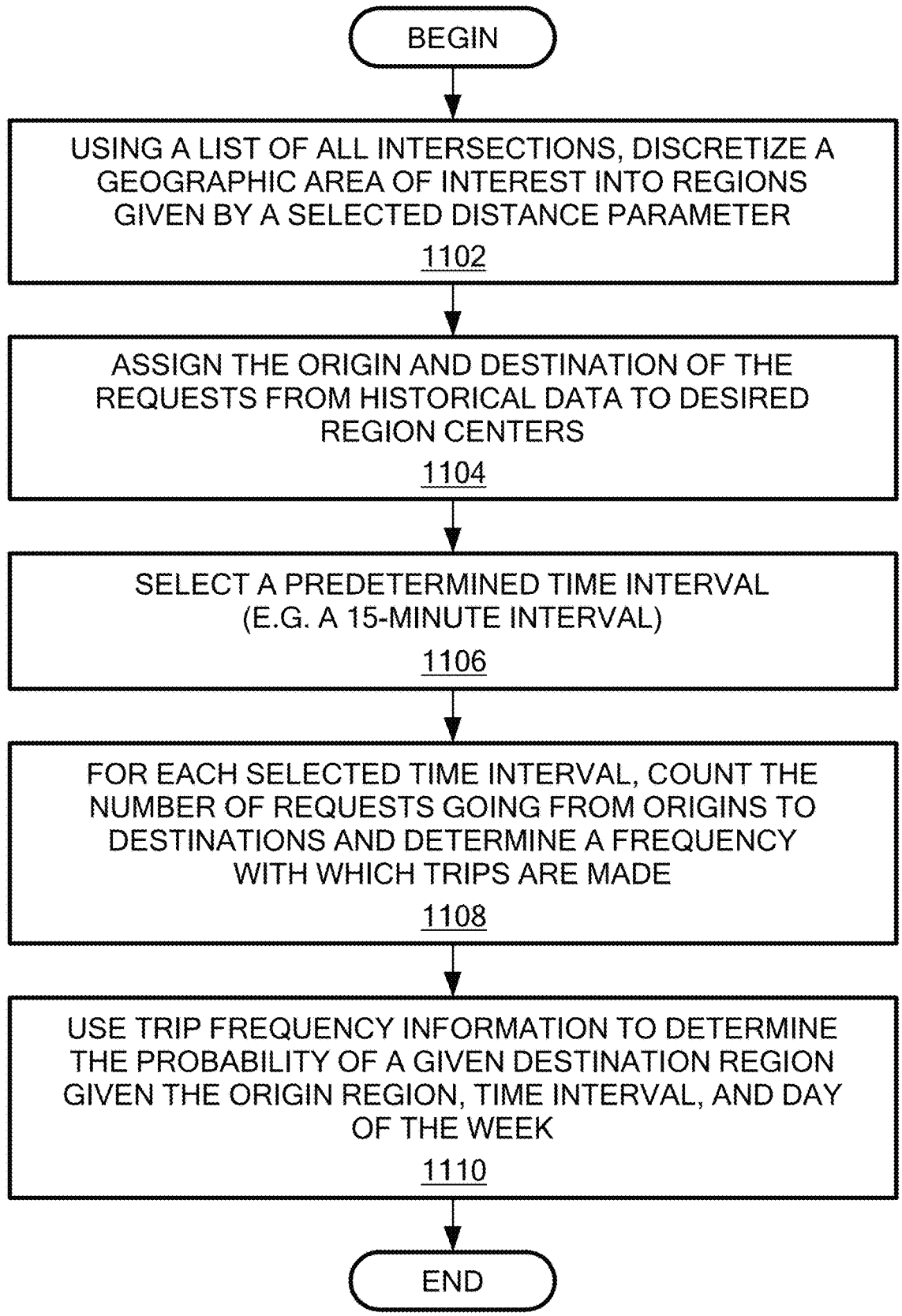
FIG. 11 is a flow diagram of a method for determining a probability distribution of origin-destination requests for fixed intervals of time.

Referring now to FIG. 11, a method for determining a probability distribution of origin-destination requests for fixed intervals of time begins as shown in processing block 1102 in using a list of all intersections, the geographic area of interest is discretized into one or more regions given by a selected distance parameter r. In embodiments, the selected distance parameter r relates to a distance a person would need to walk (e.g. a distance deemed to be an acceptable walking distance meaning a distance it can be reasonably expected a person would walk). The range of an what is an acceptable walking distance is, of course, subject to many factors including, but not limited to environmental factors (e.g. wind, rain, snow) and as well as personal preference (related to age, fitness, disability, etc. . . . ). Those of ordinary skill in the art, after reading the disclosure provided herein, will appreciate how to select a range parameter r to suit the needs of a particular application. For example, if the system is operating in an assisted living community, then range parameter r may be selected having a value which different than if the system were operating on or near a college campus (where the assumption may be that persons in an assisted living community would not want to walk (or may not be able to walk) the same distance as a person on a college campus.

With this discretization, processing then proceeds to processing block 1104 in which the origin and destination of the requests from the historical data can be assigned to the closest region centers.

As shown in processing block 1106 a predetermined time interval is selected to satisfy needs of a particular application. In one illustrative embodiment, the time interval is selected as the factors to consider in selecting a time interval include, but are not limited to As shown in processing block 1108 using a frequentist approach, for each selected time interval, (e.g. for each 15-minute interval of the week), the number of requests going from origins to destinations are counted. In embodiments, the number of requests going from every origin region to every destination region are counted.

This information is used to determine trip frequency (which may, for example, be collected and possibly stored in a frequency table).

As shown in processing block 1110, with this data (e.g. the trip frequency table data), it is possible to determine (e.g. with a processor) the probability of a given destination region given the origin region, time interval, and day of the week.

In embodiments, the discretization of a geographic area into regions may be accomplished as follows: given a list C of all the intersections in a road network of a geographic region (e.g. a city, a set of regions may be computed such that in the resulting list no two centers are within a given radius, r, of each other, i.e. $\forall i, j \in C, \|i - j\| > r$. The technique of Table 1 may be employed where BALLTREE is a space partitioning data structure that allows for fast radius bounded nearest neighbor lookup. The data structure has query function, QUERY(c,r), that lets us find all the points within r of a point c.

TABLE 1

| |
| --- |
| 1: $\mathcal{T} \leftarrow$ BALLTREE (C) |
| 2: for c ∈ C do |
| 3: C ← C \| $\mathcal{T}$.QUERY(c,r) |
| 4: end for |

Figure 12:
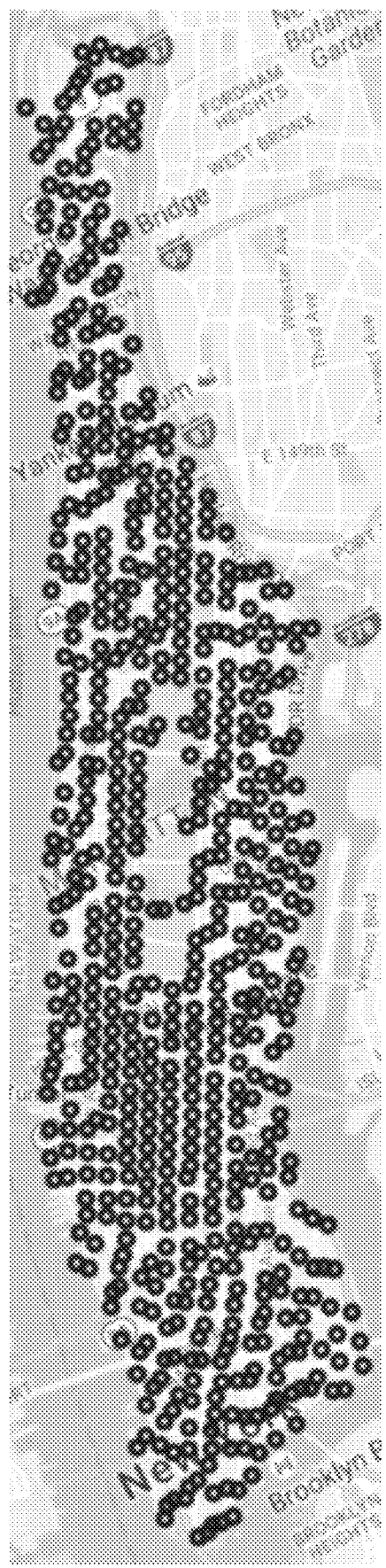
FIG. 12 is a diagrammatic view of a geographic area having in which region centers determined by a greedy station technique.

FIG. 12 is a diagrammatic view of a geographic area having region centers determined by a greedy station method.

Referring now to FIG. 12, shown are centers of regions from a discretization of a geographic area. In this illustrative embodiment, the geographic area is Manhattan and a radius of 150 meters was used. In this illustrative embodiment, the region centers were determined by a greedy station technique. Other techniques, may of course, also be used.

In embodiments, a probability distribution may be determined as follows: given the set of region centers, a probability distribution, $P(d|p;\xi,w)$ which is the probability of destination region d, may be constructed given the origin region p, time interval $\xi$, and day of the week w. In an illustrative embodiment, each day is partitioned into 15-minute intervals resulting in $1 \leq \xi \leq 96$.

As noted above, in some embodiments, the probability distribution can be generated via a frequentist approach. In one illustrative embodiment, one year of historical taxi data comprising 165,114,362 trips was used. Each trip contained the origin and destination coordinates along with the time and date of the pickup. Using this data, it is possible to populate a 96×7×|C|×|C| table, $\mathcal{F}$, indexed by the time interval, day of the week, origin region, and destination region with the number of times a given trip occurred. This allows the probability of a destination to be determined given the origin and a time period. The time period is defined as an initial and final time interval and the day of the week, $I=(\xi_0, \xi_1, w)$ resulting in the probability distribution of origin-destination $$P(d, p \mid I) = P(p \mid I) \cdot P(d \mid p, I) \quad (2)$$

where $$P(p \mid I, w) = \frac{\sum_{\xi=\xi_0}^{\xi_1} \sum_{i=1}^{|C|} \mathcal{F}_{\xi,w,p,i}}{\sum_{\xi=\xi_0}^{\xi_1} \sum_{i=1}^{|C|} \sum_{j=1}^{|C|} \mathcal{F}_{\xi,w,i,j}} \quad (3)$$

and $$P(d \mid p, I, w) = \frac{\sum_{\xi=\xi_0}^{\xi_1} \mathcal{F}_{\xi,w,p,d}}{\sum_{\xi=\xi_0}^{\xi_1} \sum_{i=1}^{|C|} \mathcal{F}_{\xi,w,p,i}} \quad (4)$$

Referring now to FIG. 13, shown is an example of predicted demand for two fixed origins and two different time periods. From this probability distribution, future requests can be sampled to anticipate demand.

Figure 13D:
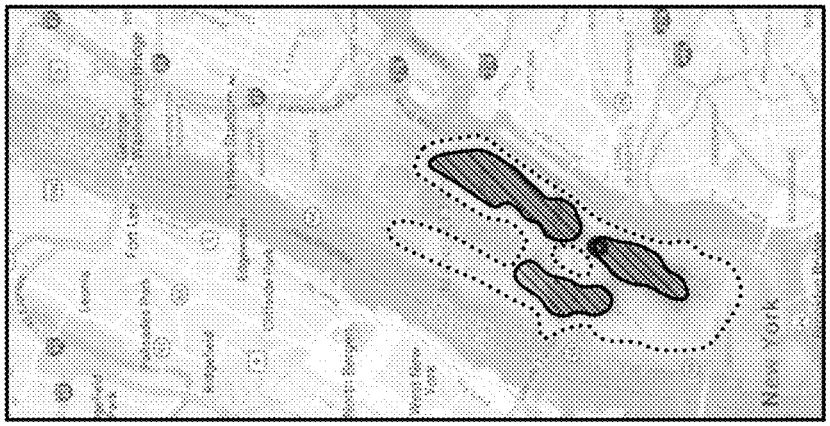
FIGS. 13A-13D are a series of heatmaps depicting a destination demand distribution.
Figure 13C:
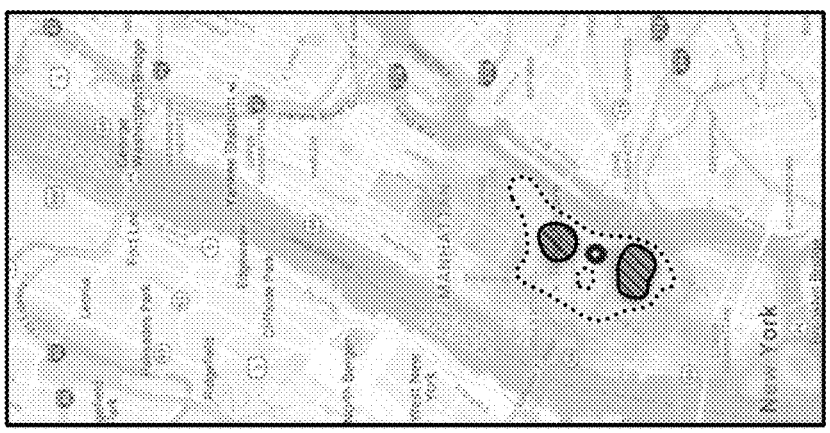
Figure 13B:
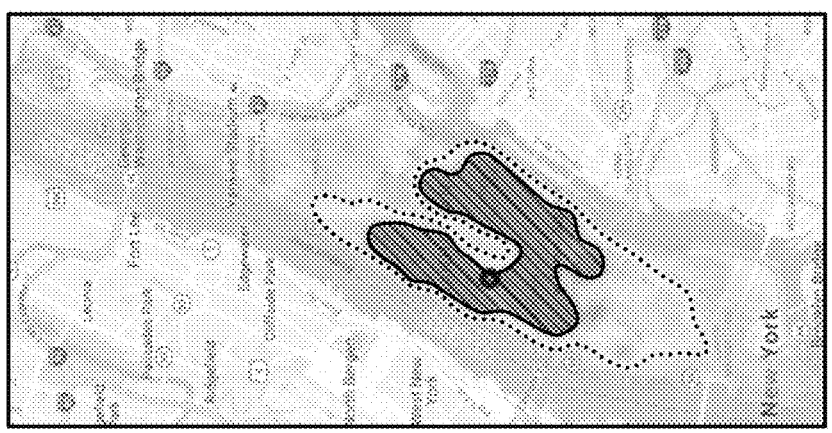
Figure 13A:
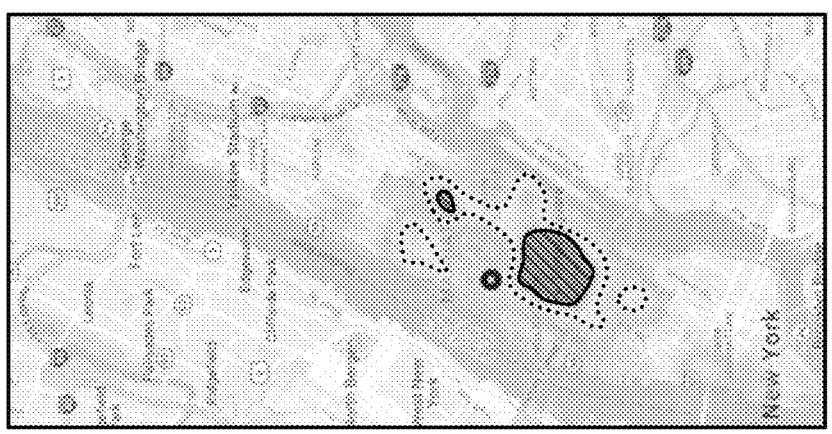

FIGS. 13A-BF are a series of heatmaps depicting the destination demand distribution. For this example, two locations in Manhattan (Westside and Eastside) are used as origins with a 30-minute time interval to show the distribution. For each location, two time intervals are used to show different snapshots of the demand throughout the day. FIG. 13A illustrates Manhattan Westside for the time window of 7:30-8:00 while FIG. 13B illustrates Manhattan Westside for the time window of 21:30-22:00. Similarly, FIG. 13C illustrates Manhattan Eastside for the time window of 7:30-8:00 while FIG. 13B illustrates Manhattan Westside for the time window of 21:30-22:00. Cross-hatched regions indicate regions with the highest demand. while stippled (or dotted) regions indicating areas of next highest demand.

Consider a given period of time $(\xi_0, \xi_1)$ and day of the week, w. A list S, comprised of the cumulative sum of frequencies from the start time to the end time and another list $L$, of the same size, comprised of the corresponding origin-destination pairs may be constructed. To sample requests, a random number s, from 0 to max(S) is generated and the index i of S such that $S_{i-1} \leq s \leq S_i$ is determined. A value Li which is the corresponding origin-destination pair of the cumulative sum of frequencies interval is returned. An illustrative process is shown in Table 2. This process, allows samples to be drawn from $\mathcal{D}(I)$. The function RAND(0;N) returns a uniformly distributed random number from 0 to N. FINDINTERVAL(S,s) returns the index i such that $S_{i-1} \leq s_i \leq S_i$ if $s > S_o$, otherwise it returns 0. This is done using binary search since S is sorted.

TABLE 2

1: $S \leftarrow \{ \}, L \leftarrow \{ \}$
2: for $\xi \in [\xi_0, \xi_1]$ do
3:   for (pd) $\in [1,|C|]^2$ do
4:     $S \leftarrow S \cup \{\max\{S\} + F_{\xi,w,p,d}\}$
5:     $L \leftarrow L \cup \{(p,d)\}$
6:   end for
7: end for
8: $s \leftarrow$ RAND (0, max(S))
9: $i \leftarrow$ FINDINTERVAL (S, s)
10: return $L_i$ The goal is to bias the vehicles towards areas where future requests are more likely to appear. The method takes into account the current state of the fleet, the current set of requests, as well as the predicted demand, comprised of both origins and destinations. The method computes a batch assignment of the current requests in the requests pool R to the vehicles of the fleet V. For real scenarios with incoming requests, this routing and assignment is performed at a constant frequency. In embodiments, this constant frequency may be once every 30 seconds. Other time intervals, may of course also be used. The particular time interval to use in any particular application may be selected in accordance with a variety of factors related to the needs of a particular application.

With respect to the system of FIG. 8, it should be appreciated that in one embodiment, in each iteration of the batch optimizer, a set of additional requests $R_{future}$ are sampled from a historical probability distribution of future demand as described above. First, a time interval is defined for the predictions $I_{pred}=[t_{now}, t_{pred}, w]$, where $t_{now}$ is the current time and $t_{pred}$ a time in the future. In one illustrative embodiment, the time in the future $t_{pred}$ is set to $t_{now}+1800s$ for an interval of 30 minutes in the future, and w is the day of the week. Also defined are a maximum number of samples $n_{pred}^{max}$.

At run time, the number of samples is given by $$n_{pred} = \min(n_{pred}^{max}, E(D(I_{pred}))), \quad (5)$$

where $E(D(I_{pred}))$ denotes the number of expected request in interval $I_{pred}$, given the distribution D estimated as described above, for example.

Each future request $r_i^{pred} \in \mathcal{R}_{future}$ is sampled, via the technique shown in Table 2, from D and the time interval, $$r_i^{pred} \sim D(I_{pred}). \quad (6)$$

At each time step, after each batch assignment, the set $R_{future}$ is cleared. New future requests will be sampled in the following time step, every 30 seconds in some embodiments.

These requests are added to the pool of requests $\mathcal{R} +:= \mathcal{R} + R_{future}$ for the current iteration (and removed afterwards). Vehicles can then be matched with trips containing future requests in $\mathcal{R}_{future}$ and may make progress towards them (although they cannot be picked since they are virtual). The additional requests $\mathcal{R}_{future}$ are subject to the same constraints Z as the real requests $\mathcal{R}$, and enter the assignment problem via the additional term in the optimization cost $C_{future}$. Following Eq. (1), this term is defined as (shown in Equation (7):

$$C_{future}\left(\sum\right) = \sum_{r \in \mathcal{R}_{ok}^{pred}} (t_r^d - t_r^*) + \sum_{r \in \mathcal{R}_{ko}^{pred}} c_{ko}^{pred}, \quad (7)$$

where $\mathcal{R}_{ok}^{pred}$ is the set of assigned future requests and $\mathcal{R}_{kp}^{pred}$ the set of unassigned future requests, such that $\mathcal{R}_{ok}^{pred} \cup \mathcal{R}_{ko}^{pred} = \mathcal{R}_{future}$.

The cost of a future request being ignored satisfies $C_{ko}^{pred} \ll c_{ko}$, much lower than that of real requests. This process gives preference to real requests, with a bias in the assignment and routing towards servicing areas of higher expected future demand.

The batch assignment technique comprises: sampling a set of requests $\mathcal{R}_{future} \sim D$; computing a pair-wise request-vehicle shareability graph (RV-graph) between the requests $\mathcal{R}+$ and the vehicles V; in this graph, request r and vehicle v are connected if, given the current state of v, request r can be satisfied by v while respecting the defined constraints Z for maximum waiting time, delay and vehicle capacity; computing a graph (RTV-graph) of feasible trips (formed by one or more requests) and the vehicles that can serve them within the specified constraints; each trip may contain both real and predicted requests; feasible trips are computed incrementally for each vehicle. Each trip is linked in the graph to the requests that form it and the vehicles that can serve it while respecting the constraints Z; computing a greedy assignment $\Sigma_{greedy}$, where trips are assigned to vehicles iteratively in decreasing size of the trip and increasing cost (the idea is to maximize the amount of requests served while minimizing cost); starting from the greedy assignment, solve an Integer Linear Program to compute an optimal assignment $\Sigma_{optim}$ of vehicles to trips, and therefore to requests.

As described above in conjunction with FIGS. 1-7, a binary variable is added for each link between a feasible trip and a vehicle that can execute it within the RTV-graph; this assignment also provides the optimal routes, as computed in the RTV-graph; and rebalancing the remaining idle vehicles towards areas with a deficit of vehicles and too many requests via a Linear Program; the idle vehicles are assigned to the unassigned requests of the previous step.

Following the notation described above in conjunction with FIGS. 1-7, the new Integer Linear Program (fifth step of the method, see the technique of Table 3) comprises the following binary variables $$X = \{\epsilon_{i,j}, X_k; \forall (T_i, v_j) \text{ edge in } RTV\text{-graph}, \forall r_k \in \mathcal{R}+\}.$$

From Eq. (1) and Eq. (7) the cost terms $c_{i,j}$ are given by the sum of delays for all the passengers and requests associated to a trip $T_i$, as served by a vehicle $v_j$ $$c_{i,j} = \sum_{r \in I_{T=i, V=j}^R} (t_r^d - t_r^*) + \sum_{p \in I_{V=j}^P} (t_p^d - t_p^*), \quad (8)$$

TABLE 3

1: Initial guess: $\Sigma_{greedy}$

2: $\sum_{optim} := \arg \min_{X} \sum_{i, j \in \varepsilon_{TV}} c_{i,j} \epsilon_{i,j} +$ 3: $\sum_{1 \le k \le n} c_{ko} X k + \sum_{n+1 \le k \le n + n_{pred}} c_{ko}^{pred} X k$ 4: s.t. $\sum_{i \in \mathcal{T}_{V=j}^T} \epsilon_{i,j} \le 1 \quad \forall V_j \in V$ 4: $\sum_{i \in \mathcal{T}_{R=k}^T} \sum_{J \in \mathcal{T}_{T=i}^V} \epsilon_{i,j} + \chi k = 1 \quad \forall r_k \in R+$ where $\mathcal{T} T_{V=i}^R$, v=j denotes the requests in trip $T_i$ as served by vehicle $v_j$, and $\mathcal{T}_{V=j}^P$ the passengers of vehicle $v_j$.

The optimal assignment is obtained by solving the ILP of technique Table 3. Recall that: $\varepsilon_{TV}$ denotes the edges between a trip $T_i$ and a vehicle $v_j$ in the RTV-graph (i.e. there exists a route for which vehicle $v_j$ can serve trip $T_i$ within the given constraints Z) $\mathcal{T}_{V=j}^T$ denotes the trips that can be served by vehicle $\mathcal{T}_{T=i}^V$ denotes the trips (combinations of requests) in which request $r_k$ can be served; and $\mathcal{T}_{T=i}^V$ denotes the vehicles that can serve trip $T_i$.

After assignment and routing, the vehicles make progress towards their assigned requests, picking requests (which become passengers) as they reach them, and the set $\mathcal{R}_{future}$ is cleared. Then, this process is repeated at the desired frequency with the incoming requests.

It should be appreciated that the number of variables in the ILP is equal to the number of edges e(T,v) in the RTV graph plus the number of requests in $\mathcal{R}*$. In the worst case, it is of order $O(m(n+n_{pred})^v)$, only reached with complete RV and RTV-graphs where all vehicles can serve all requests and all requests can be combined with each other. In practice, the number of variables is orders of magnitudes lower and related to the size of the cliques in the RV-graph, but does scale poorly with the number of predicted requests $n_{pred}$, since they can typically be combined with many of the current requests (since they are at a future time at which some of the passengers might have been dropped off). The number of constraints is $n+n_{pred}+m$.

It should also be appreciated that the proposed model includes the constraints Z and the cost term $C = C_{now} + C_{future}$ which aim at minimizing the total delay in expectation, with respect to the current passengers, the current requests and the expected future demand D. With respect to the model, this method guarantees optimality of the assignment of the currently active requests, while satisfying the constraints Z, if all the steps are executed until termination and exploration of all possible trips and assignments. In practice, timeouts are set both for the amount of time spent generating candidate trips for each vehicle, and for the amount of time spent exploring the branches of the ILP. A limit on the number of vehicles considered per request, the number of trips per vehicle or the optimality gap of the ILP can also be set. These timeouts trade-off optimality for tractability and their values will depend on the available resources. It should be noted that the described future prediction technique is not reactive but does account for a prediction of the future demand. Furthermore, the method seamlessly allows for parallelization in all steps.

The performance of an example system operating in accordance with the concepts described herein may be assessed with a fleet of 1000, 2000, and 3000 vehicles of capacity two and four passengers using a fixed maximum waiting time of $\Omega = 5$ minutes and a maximum delay of $\Delta = 10$ minutes. The minimum inter-station distance used for the region discretization was 150 meters. For the experiments, one week of historical taxi trip data from 00:00 on Sunday May 5, 2013 to 23:59 on Saturday May 11, 2013 was used to assess the performance of the system and techniques described herein. This data comes from a publicly available source of all taxi trips in Manhattan, N.Y., USA. This dataset contains the geographical coordinates for the origins and destinations along with the associated pick up and drop off dates and times for all trips in executed by the 13,586 active taxis in New York City. From this data, the request and pick up time are considered to be equal since the time for the request is not publicly available.

In order to find routes for the taxis to execute, the entire road network of Manhattan is we considered. The travel time for each road segment is estimated using a daily mean travel time. In one illustrative embodiment, the daily mean travel time may be computed by the method described in P. Santi; G. Resta, M. Szell, S. Sobolvesky, S. Strogatz and C. Ratti "Quantifying the Benefits of Vehicle Pooling with Shareability Networks," PNAS, 2014. Different travel times were used for weekdays, Saturday, and Sunday. The shortest paths using these travel times were precomputed between every two intersections in the road network and were stored in a look-up table.

In this embodiment, the vehicles are initialized each day at midnight at sampled positions from the demand distribution. The execution of the fleet is simulated by issuing the requests obtained from the historical taxi dataset for the given day. The requests are collected within a 30 second time window after which they are assigned in batch to different vehicles using the technique described herein. In each time interval, or assignment step, future requests are sampled up to 30 minutes in the future. The number of predictions are varied by using 0, 200, and 400 sampled predicted requests (per interval). These predicted requests enter the assignment problem technique of Table 3, but are removed immediately afterwards, with new future requests being sampled in the following step. They do affect the assignment and routing at that time.

A pool of requests are kept until they have been picked up in case they can be reassigned to a better match. In this example, the number of requests in a single day varied from 382,779 on Sunday to 460,700 on Friday.

Several metrics are collected that characterize the system, including the service rate, in-car travel delay, waiting time, average distance traveled by the vehicles, percentage of shared rides, and the computational time. The parameters include the additional sampled requests and cost term. These metrics are plotted for vehicle capacities two and four side by side in FIGS. 14A-14F.

Figure 14E:
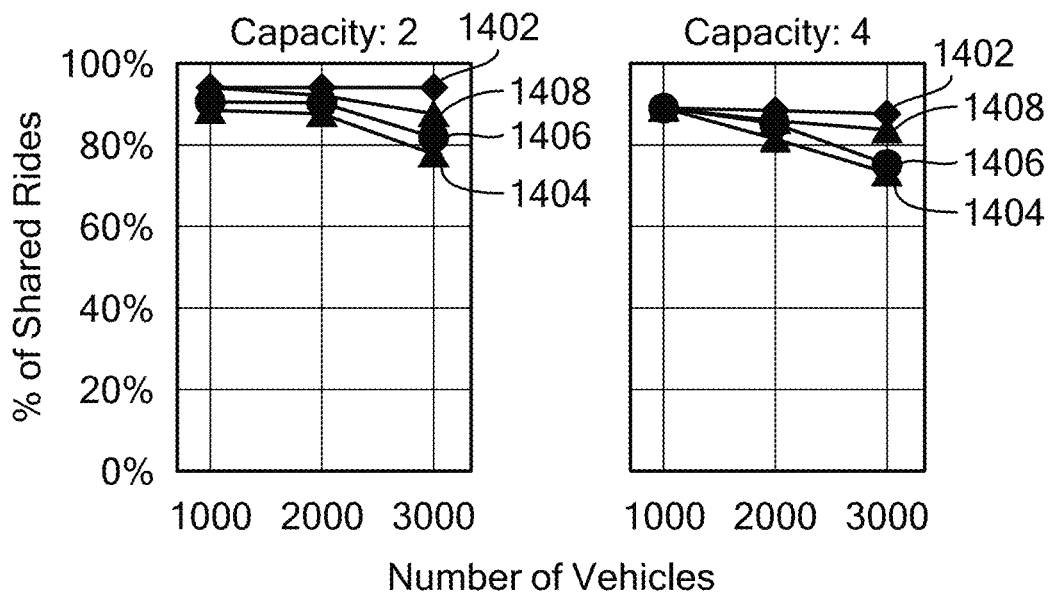
Figure 14F:
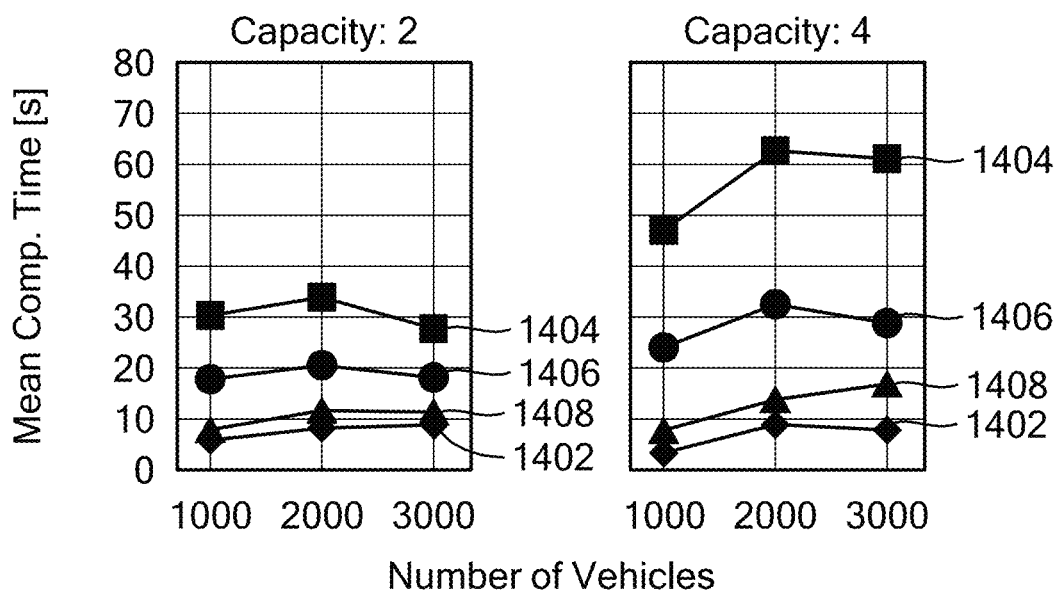

Referring now to FIGS. 14A-14F, these figures show a comparison of several performance metrics for varying number of sampled requests (No rebalancing 1402, Reactive 1408 (0 samples), 200 samples 1406, and 400 1404 samples). The reactive method follows the techniques described herein. Each subplot corresponds to the vehicle capacity of 2 and 4 with the x-axis showing the fleet size (1000, 2000, and 3000 vehicles). A number of parameters are analyzed including (a) service rate (percentage of requests serviced as shown in FIG. 14A), (b) average in car delay $\delta-\omega$, as shown in FIG. 14B; (c) average waiting time $\omega$, as shown in FIG. 14C; (d) average distance traveled by each vehicle during a single day, as shown in FIG. 14D (e) percentage of shared rides (number of passengers who shared a ride, divided by the total number of picked-up passengers) as shown in FIG. 14E and (f) average computational time for a 30 seconds iteration of the method, in a 24 core 2.5 GHz machine, including computation of the RV-graph, computation of the RTV-graph, ILP assignment including the sampled requests, rebalancing and writing the data to file as shown in FIG. 14F.

It is observed that the service rate (number of requests serviced) remains approximately constant independently of the number of sampled requests, and it is close to 100% for 3,000 vehicles of capacity 4 (there are 13,000 active taxis per day in Manhattan). By sampling predicted requests, the system is able to reduce the mean in-car travel delay by 1.5 minutes and the mean waiting time by around 1 minute, with respect to the reactive approach.

Particularly, for the in-car travel delay and the waiting time, it can be seen that there is a large benefit in using rebalancing and then a similar benefit by sampling predicted requests, see FIGS. 14B and 14C). However, increasing the number of samples from 200 to 400 only marginally decreased the in-air travel delay by 3.4 seconds, when using a four-passenger vehicle capacity and 3000 vehicles. It is likely that this small improvement is due to the time-outs introduced for real-time performance, which limit the benefit of additional samples. It is believed that the increase would be larger if the technique was run to optimality.

Observed is a trade-off between operational cost and performance, since the travel distance by the vehicles and the computational time of the approach do increase with the number of samples. The increase in travel distance arises from the fact that vehicles are routed towards predicted requests which may or may not appear in reality. This reduces mean waiting time and mean delay but does increase the miles traveled by each vehicle. The increase in computational time is due to the larger number of requests that enter the routing and assignment problem. Furthermore, since they are in the future, they can be combined with many different trips, which leads to a potentially large number of feasible trips to be accounted for in the assignment. Nonetheless, the approach can be parallelized and would benefit from the large parallel servers available for fleet management companies.

Thus, an experimental study confirms that the performance of a mobility-on-demand system with ridesharing via the methods described herein improves with knowledge of future demand.

In summary, described is a method and system for vehicle routing and request assignment which incorporates a prediction of future demand. The method seamlessly integrates sampled future requests into a request assignment and vehicle routing technique. It has been shown experimentally that including predictions improves the positioning of the fleet of vehicles towards satisfying future requests, reducing waiting time and travel time. This is a step closer towards long term optimality.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

All publications and references cited herein are expressly incorporated herein by reference in their entirety.

The invention claimed is:

1. A system for controlling and continuously rerouting a fleet of vehicles based up on real-time requests, the system comprising:
   (a) means for receiving current requests for rides within a window and for receiving a prediction of future demand;
   (b) means for generating a pairwise request-vehicle shareability graph (RV-graph) which takes into account the prediction of future demand, a current state of the fleet of vehicles, and the current requests for rides;
   (c) means for generating a request-trip-vehicle graph (RTV-graph) of trips and one or more vehicles within the fleet of vehicles that can serve the trips which takes into account the prediction of future demand, wherein each of the trips corresponds to a group of one or more of the current requests for rides and has a trip size corresponding to a number of the current requests for rides, wherein generating the RT/Fadey S. Jabr/V-graph includes finding feasible trips incrementally in trip size for each vehicle using the RV-graph;

(d) means for solving an integer linear program (ILP) to determine an assignment of vehicles to trips while taking into account the prediction of future demand; and (e) means for assigning specific vehicles from the fleet of vehicles to specific trips while taking into account the prediction of future demand.

2. The system of claim 1 further comprising means for determining a feasibility of trips in the RTV-graph.

3. The system of claim 1 further comprising means for rebalancing idle vehicles to areas with high demand.

4. The system of claim 1 wherein the fleet of vehicles is a fleet of autonomous vehicles.

5. The system of claim 1, comprising: means for determining a probability distribution of origin-destination requests for fixed intervals of time, wherein the means for generating a pairwise request-vehicle shareability graph takes into account the prediction of future demand using the probability distribution.

6. The system of claim 5, wherein using the probability distribution comprises sampling future requests from the probability distribution to anticipate demand.

7. The system of claim 1, wherein finding the feasible trips incremental in trip size for a vehicle includes finding trips where all the corresponding current requests for rides can be picked up and dropped off by the vehicle while satisfying one or more constraints.

8. The system of claim 1 wherein: the fleet of vehicles comprises one or more autonomous vehicles; and the means for assigning specific vehicles from the fleet of vehicles to specific trips comprises: a communication network; and a mobility-on-demand (MoD) fleet controller configured to communicate with the one or more autonomous vehicles over the communication network to control the one or more autonomous vehicles.

* * * * *